United States Patent
Urita

(10) Patent No.: US 12,101,447 B2
(45) Date of Patent: Sep. 24, 2024

(54) SHEET FEEDING APPARATUS, IMAGE READING APPARATUS, AND IMAGE FORMING APPARATUS

(71) Applicant: CANON KABUSHIKI KAISHA, Tokyo (JP)

(72) Inventor: Akira Urita, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/397,253

(22) Filed: Dec. 27, 2023

(65) Prior Publication Data

US 2024/0236249 A1     Jul. 11, 2024

(30) Foreign Application Priority Data

Jan. 6, 2023    (JP) .................. 2023-001134

(51) Int. Cl.
| | |
|---|---|
| *H04N 1/04* | (2006.01) |
| *B65H 1/04* | (2006.01) |
| *B65H 5/36* | (2006.01) |
| *H04N 1/00* | (2006.01) |

(52) U.S. Cl.
CPC ............ *H04N 1/0057* (2013.01); *B65H 1/04* (2013.01); *B65H 5/36* (2013.01); *H04N 1/00559* (2013.01); *B65H 2801/06* (2013.01)

(58) Field of Classification Search
USPC ................................................ 358/498, 496
See application file for complete search history.

(56) References Cited

U.S. PATENT DOCUMENTS

| | | | |
|---|---|---|---|
| 2017/0142271 A1* | 5/2017 | Kawai | ............... H04N 1/00623 |
| 2019/0185281 A1 | 6/2019 | Niwata et al. | |

FOREIGN PATENT DOCUMENTS

| | | |
|---|---|---|
| JP | H0264535 U | 5/1990 |
| JP | 2019108221 A | 7/2019 |
| JP | 2021001037 A | 1/2021 |

\* cited by examiner

*Primary Examiner* — Cheukfan Lee
(74) *Attorney, Agent, or Firm* — ROSSI, KIMMS & McDOWELL LLP

(57) ABSTRACT

A sheet feeding apparatus includes a feeding member, a first supporting member including a first supporting surface, and a second supporting member including a second supporting surface. The second supporting member is configured to move between a first position above the first supporting member and a second position to which the second supporting member is retracted upward from the first position. In a state where the second supporting member is positioned at the first position, the feeding member is configured to feed a first sheet supported on the first supporting surface and a second sheet supported on the second supporting surface. In a state where the second supporting member is positioned at the second position, the feeding member is configured to feed the first sheet that is supported on the first supporting surface at a position below the second supporting member.

19 Claims, 13 Drawing Sheets

SHEET FEEDING APPARATUS, IMAGE READING APPARATUS, AND IMAGE FORMING APPARATUS

BACKGROUND OF THE INVENTION

Field of the Invention

The present disclosure relates to a sheet feeding apparatus that feeds a sheet, an image reading apparatus that reads image information from a sheet, and an image forming apparatus that forms an image on a recording material.

Description of the Related Art

In an image reading apparatus, a sheet feeding apparatus such as an auto document feeder (ADF) feeds a document sheet. In recent years, the sheet feeding apparatus has been required to feed a variety of sizes of sheets. Japanese Patent Application Publication No. 2021-1037 describes an image reading apparatus that includes a receipt guide that can move with respect to a media tray body. The image reading apparatus can feed an A4 sheet if the receipt guide is positioned at an unfolded position, and can feed a receipt if the receipt guide is positioned at a folded position.

In the configuration described in Japanese Patent Application Publication No. 2021-1037, the receipt guide is moved to the unfolded position if no receipt is fed. However, in the state where the receipt guide is positioned at the unfolded position, the receipt guide projects toward the upstream side of the media tray body in the sheet feeding direction. Thus, the space necessary for using the image reading apparatus is increased.

SUMMARY OF THE INVENTION

The present disclosure provides a sheet feeding apparatus, an image reading apparatus and an image forming apparatus that can feed sheets with a variety of sizes while improving space-saving feature.

According to one aspect of the disclosure, a sheet feeding apparatus includes a feeding member configured to feed a sheet in a sheet feeding direction, a first supporting member including a first supporting surface configured to support a first sheet, and a second supporting member including a second supporting surface configured to support a second sheet, the second supporting member being configured to move between a first position and a second position, the first position being a position which is above the first supporting member and at which the second supporting member supports the second sheet, the second position being a position to which the second supporting member is retracted upward from the first position, wherein in a state where the second supporting member is positioned at the first position, the feeding member is configured to feed the first sheet supported on the first supporting surface and the second sheet supported on the second supporting surface, and wherein in a state where the second supporting member is positioned at the second position, the feeding member is configured to feed the first sheet that is supported on the first supporting surface at a position below the second supporting member.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

First Embodiment

Figure 13:
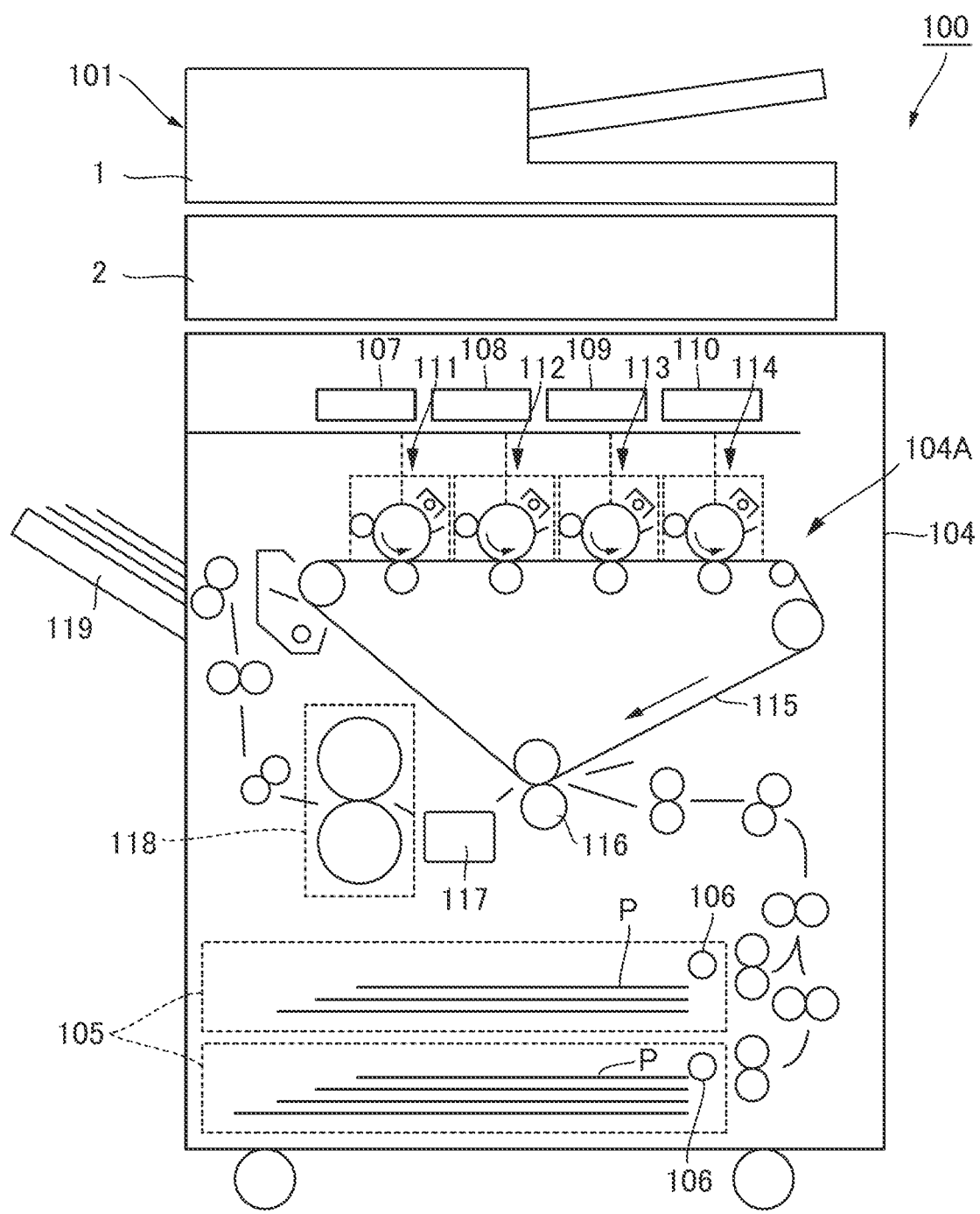
FIG. 13 is a schematic diagram of an image forming apparatus of the first embodiment.

A sheet feeding apparatus, an image reading apparatus, and an image forming apparatus of a first embodiment will be described. First, an outline of an image forming apparatus 100 of the present embodiment will be described with reference to FIG. 13. FIG. 13 is a schematic diagram of the image forming apparatus 100 that includes an image reading apparatus 101.

As illustrated in FIG. 13, the image forming apparatus 100 includes an image forming apparatus body (hereinafter referred to as a printer body 104), and the image reading apparatus 101 disposed above the printer body 104. The image forming apparatus 100 forms an image on a recording material P, based on image information that the image reading apparatus 101 has read from a document, or on image information that the image forming apparatus 100 has received from an external apparatus communicatively connected to the image forming apparatus 100. The recording material (recording medium) P or the document may be any one of a variety of sheets with different sizes and materials. For example, the recording material (recording medium) P or the document may be a paper sheet, such as a plain paper sheet or a thick paper sheet, a sheet material, such as a coated paper sheet, on which certain surface treatment has been performed, a specially-shaped sheet material, such as an envelope or an index paper sheet, a plastic film, or a cloth sheet.

The printer body 104 contains an electrophotographic image forming portion 104A, which is one example of image forming portions. The image forming portion 104A includes four image forming units (process units) 111, 112, 113, and 114; four laser scanners 107, 108, 109, and 110, which serve as exposing units; and an intermediate transfer belt 115, which serves as an intermediate transfer member. The image forming portion 104A is a tandem-type intermediate-transfer electrophotographic unit in which the image forming units 111, 112, 113, and 114 are disposed adjacent to each other along the intermediate transfer belt 115.

Each of the image forming units 111 to 114 includes a photosensitive drum that serves as an image bearing member, a charger, and a development unit. The charger and the development unit operate for the photosensitive drum. The photosensitive drum is a photoreceptor formed like a cylinder (drum). The development unit contains toner that serves as developer. The image forming units 111 to 114 are disposed along the intermediate transfer belt 115. The intermediate transfer belt 115 is an endless (belt-like) member stretched by and wound around a plurality of rollers. In addition, a secondary transfer roller 116 is in contact with the outer circumferential surface of the intermediate transfer belt 115. Between the intermediate transfer belt 115 and the secondary transfer roller 116, a secondary transfer portion is formed as a nip portion.

In addition, the printer body 104 includes at least one feeding cassette 105, a feeding roller 106 disposed in a corresponding feeding cassette 105, a pre-fixing conveyance portion 117, a fixing apparatus 118, and a discharging tray 119. The feeding cassette 105 is an example of a stacking portion (or a storage portion) on which the recording material P is stacked. The feeding roller 106 is an example of a feeding portion or feeding member that feeds the recording material P. The pre-fixing conveyance portion 117 is a conveyance unit that conveys the recording material P from the secondary transfer portion to the fixing apparatus 118. The fixing apparatus 118 has a heat-fixing system. For example, the fixing apparatus 118 includes a roller pair that nips and conveys the recording material P, and a heating portion (or a heat source), such as a halogen lamp or an induction heating mechanism, that heats an image formed on the recording material P. The discharging tray 119 is a stacking portion on which the recording material P, on which an image is formed, is stacked.

If a command to execute an image forming operation is given to the image forming apparatus 100, the photosensitive drum and the intermediate transfer belt 115 are driven and rotated in the image forming portion 104A. The charger charges the surface of the photosensitive drum. The laser scanners 107 to 110 respectively emit laser beams to the photosensitive drums of the image forming units 111 to 114 in accordance with image signals, and thereby form electrostatic latent images on the surfaces of the photosensitive drums. The image signals represent yellow, magenta, cyan, and black components of image information, obtained by decomposing the image information. The electrostatic latent image is developed into a toner image, with toner supplied from the development unit. The toner image formed on each of the photosensitive drums is primary-transferred onto the intermediate transfer belt 115. In the primary transfer, multiple-transfer is performed such that one toner image of yellow, magenta, cyan, or black is put on another, so that a full-color image is formed on the intermediate transfer belt 115.

In parallel with the formation of the toner image performed by the image forming portion 104A, the recording material P is fed toward the secondary transfer portion. The feeding roller 106 abuts against the uppermost recording material P of a sheet bundle stored in the feeding cassette 105, and sends the recording material P from the feeding cassette 105. The recording material P is conveyed to the secondary transfer portion through a plurality of conveyance roller pairs, at a timing at which the toner image is formed by the image forming portion 104A. In the secondary transfer portion, the image is secondary-transferred from the intermediate transfer belt 115 onto the recording material P.

The recording material P having passed through the secondary transfer portion is conveyed to the fixing apparatus 118 through the pre-fixing conveyance portion 117. While conveying the recording material P, the fixing apparatus 118 fixes the image formed on the recording material P, to the recording material P by heating and pressing the image. The recording material P having passed through the fixing apparatus 118 is discharged to the outside of the printer body 104 by a discharging roller pair, and is stacked on the discharging tray 119.

Note that although the description has been made for the image forming portion 104A that is an intermediate-transfer electrophotographic unit that serves as one example of image forming portions, the present disclosure is not limited to this. For example, the image forming portion may be a direct-transfer electrophotographic unit, or may be an ink-jet image forming unit.

Outline of Image Reading Apparatus

Figure 1:
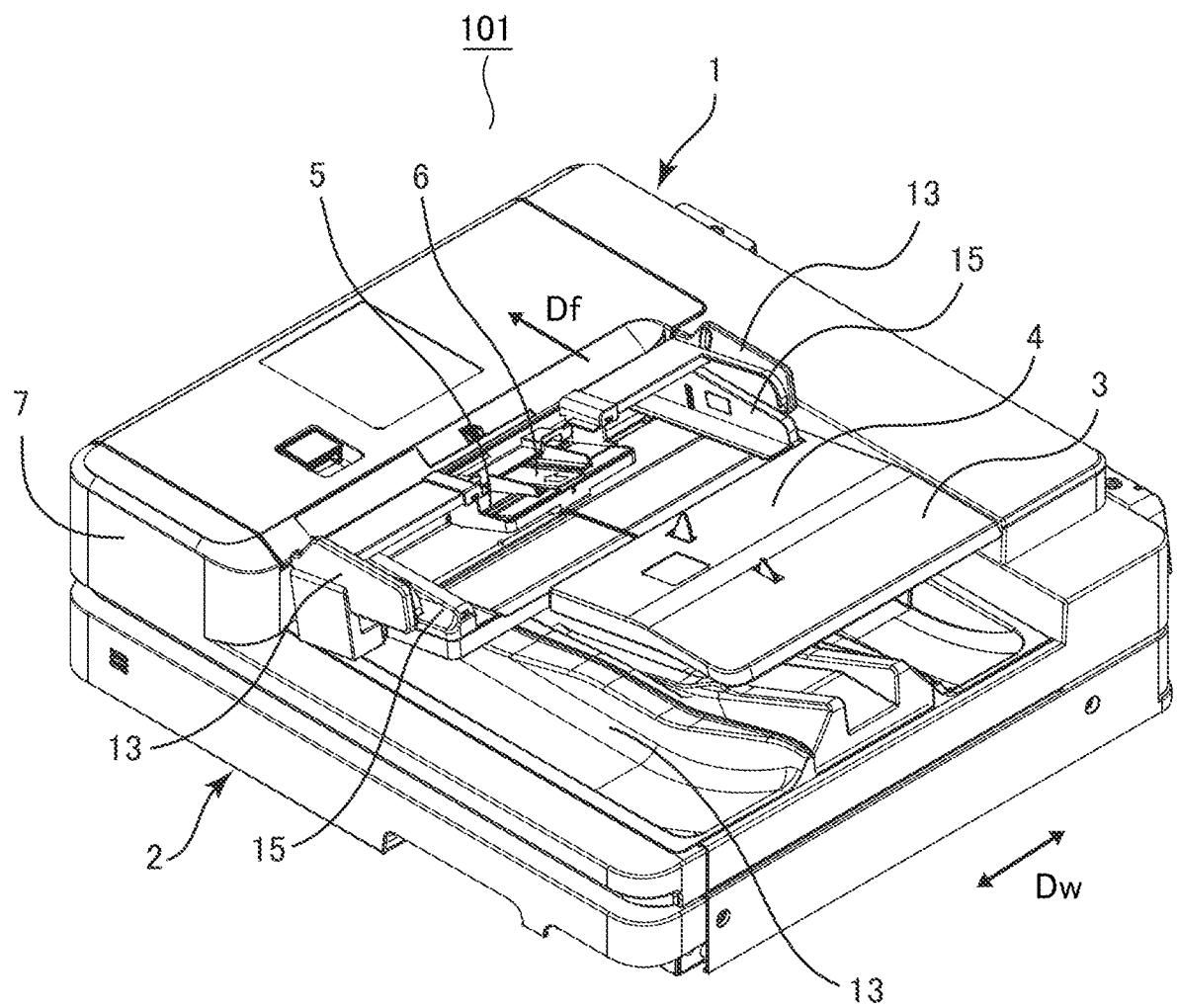
FIG. 1 is a perspective view of an image reading apparatus of a first embodiment.

Next, an outline of the image reading apparatus 101 will be described. FIG. 1 is a perspective view of the image reading apparatus 101. Each of FIGS. 2A and 2B is a schematic diagram illustrating a cross section of the image reading apparatus 101.

Figure 2A:
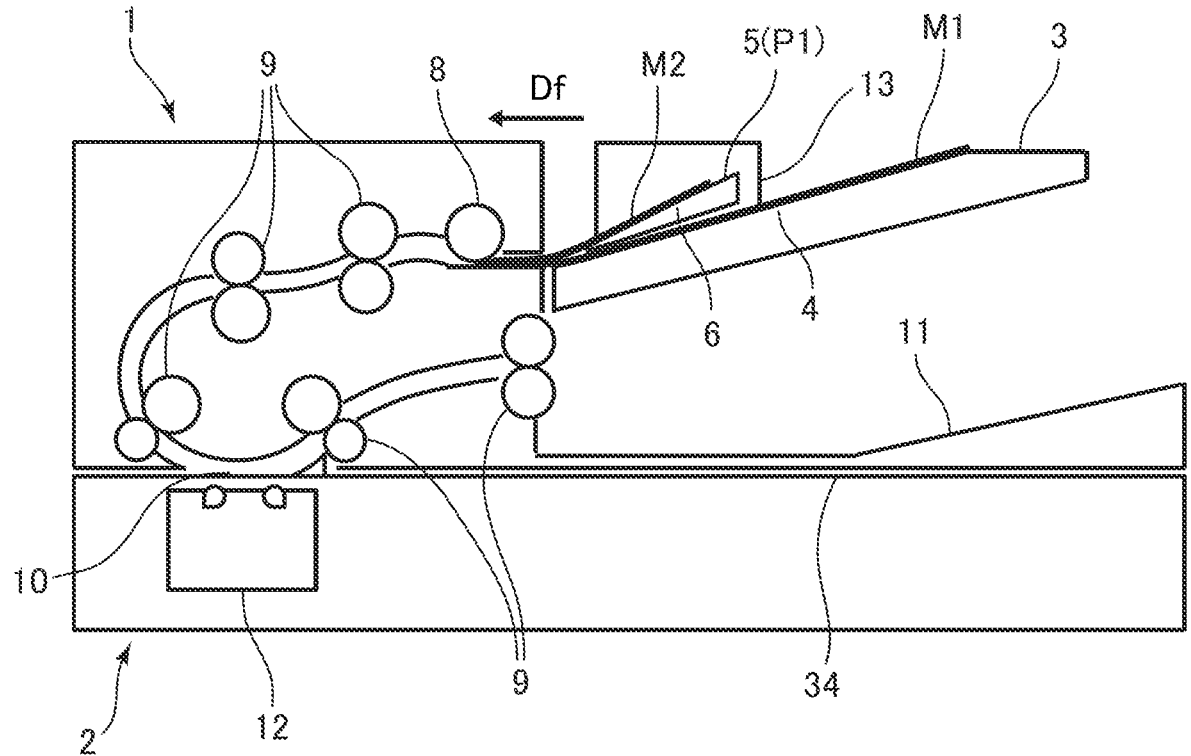
FIG. 2A is a schematic diagram of the image reading apparatus of the first embodiment.
Figure 2B:
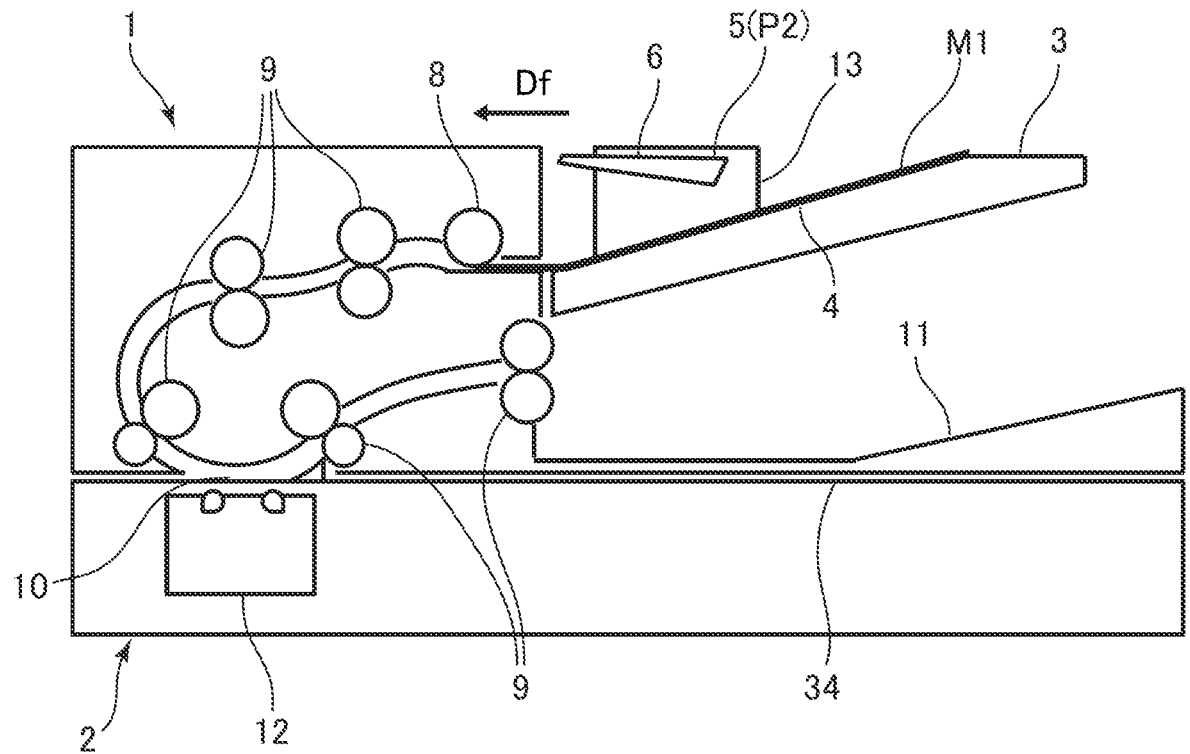
FIG. 2B is a schematic diagram of the image reading apparatus of the first embodiment.

As illustrated in FIGS. 1, 2A, and 2B, the image reading apparatus 101 includes a reader portion (or a fixed portion) 2, and an auto document feeder (hereinafter referred to as an ADF) 1 supported by the reader portion 2. In the present embodiment, the reader portion 2 is fixed to a top surface portion of the printer body 104 (FIG. 13).

In the following description and the accompanying drawings, the direction in which the ADF 1 sends a document M1 or M2 from a below-described first document tray 3 or second document tray 5 is defined as a sheet feeding direction Df. In addition, the direction along the surface of the document M1 placed on the first document tray 3 and orthogonal to the sheet feeding direction Df is defined as a sheet width direction Dw. In addition, the vertical direction (i.e., the gravity direction) in a state where the image forming apparatus 100 is installed on a horizontal plane is referred to as an up-down direction. Note that in the present embodiment, one side in the sheet width direction Dw (i.e., the lower left side in FIG. 1) is the front side (i.e., the front surface side) of the image forming apparatus 100 and the image reading apparatus 101. In addition, the other side in the sheet width direction Dw (i.e., the upper right side in FIG. 1) is the back side (i.e., the back surface side) of the image forming apparatus 100 and the image reading apparatus 101.

The reader portion 2 includes a document platen glass 34 on which a document is placed, and a reading unit 12 disposed below the document platen glass 34. The reading unit 12 can move between a position (i.e., a document feeding-reading position illustrated in FIGS. 2A and 2B) at which the reading unit 12 reads image information from the document M1 or M2 conveyed by the ADF 1, and a position below the document platen glass 34. In addition, the reading unit 12 can move in a space below the document platen glass 34, in a sub-scanning direction (i.e., the right-left direction in FIGS. 2A and 2B).

The reading unit 12 is an example of a reading portion (i.e., a first reading portion) that reads an image formed on a sheet. For example, the reading unit 12 of the present embodiment is a contact-image-sensor (CIS) image sensor unit. The reading unit 12 includes a sensor board, a light source, and a lens array. On the sensor board, light receiving elements (i.e., complementary metal-oxide-semiconductor: CMOS sensors) are disposed along the sheet width direction Dw. The light source emits light to a document; and the lens array guides the light reflected from the document, to the image forming surface of the light receiving elements. Note that the reading unit 12 may be a charge-coupled device (CCD) image sensor unit. In this case, CCD sensors are used as the light receiving elements, and the light reflected from a document is guided to the image forming surface of the light receiving elements, by a reduction optical system that includes a plurality of mirrors and lenses.

The ADF 1 includes the first document tray 3, the second document tray 5, a feeding roller 8, a plurality of conveyance roller pairs 9, and a discharging tray 11. In addition, the ADF 1 also includes a conveyance path 16 that extends from the feeding roller 8 to the discharging tray 11 via a reading position 10. The reading position 10 is a position at which the reading unit 12 optically scans the document. The plurality of conveyance roller pairs 9 are disposed along the conveyance path 16. The first document tray 3 and the second document tray 5 are positioned above the discharging tray 11, and the conveyance path 16 is curved like a U shape when viewed in the sheet width direction Dw. A portion of the ADF 1 in which the conveyance path 16 is formed is defined as a main-body portion 7 of the ADF 1.

The ADF 1 is an example of a sheet feeding apparatus that feeds sheets. The ADF 1 of the present embodiment feeds the documents M1 and M2, which are sheets. The feeding roller 8 is an example of a feeding member that feeds sheets. The first document tray 3 is an example of a first supporting portion that supports a sheet. The second document tray 5 is an example of a second supporting portion that can support a sheet whose length in the sheet width direction Dw is shorter than that of the sheet supported on the first supporting portion. Each of the conveyance roller pairs 9 is an example of a conveyance portion that conveys a sheet fed by the feeding member. The discharging tray 11 is an example of a discharging portion (or a stacking portion) to which the sheet is discharged.

The first document tray 3 can pivot on a pivot shaft, with respect to the main-body portion 7 of the ADF 1. Thus, a user can easily take out a document located on the discharging tray 11, by pivoting the first document tray 3 upward. In addition, the second document tray 5 can be attached to the first document tray 3. Even in a state where the second document tray 5 is attached to the first document tray 3, the first document tray 3 can pivot with respect to the main-body portion 7 of the ADF 1.

The feeding roller 8 rotates in contact with the top surface of the document M1 or M2 placed on the first document tray 3 or the second document tray 5, and thereby feeds the document M1 or M2 in the sheet feeding direction Df. Note that a belt member stretched between and wound around rollers, which rotate, may be used as the feeding member.

The image reading apparatus 101 can perform an operation (i.e., fixed-document reading) in which the image information is read from a document that is placed on the document platen glass 34 and that is not moved, and an operation (i.e., document feeding reading) in which the image information is read from a document while the sheet (which is the document) is conveyed by the ADF 1.

In the fixed-document reading, a user opens the ADF 1 and places a document on the document platen glass 34, then closes the ADF 1, and then instructs the start of the reading operation by operating an operation portion of the image forming apparatus 100. After that, the reading unit 12 reads the image information of the document by optically scanning the surface of the document through the document platen glass 34 while moving in a space below the document platen glass 34, in the sub-scanning direction.

In the document feeding reading, a user places the document M1 or M2 on the first document tray 3 or the second document tray 5, and then instructs the start of the reading operation by operating the operation portion of the image forming apparatus 100. After that, the feeding roller 8 of the ADF 1 starts to rotate, and sends the document M1 or M2 placed on the first document tray 3 or the second document tray 5 in the sheet feeding direction Df. Specifically, the feeding roller 8 sends the uppermost document first, and then sends the following documents sequentially.

The document, the conveyance of which has been started by the feeding roller 8, is conveyed in the main-body portion 7 of the ADF 1, along the conveyance path 16. In the conveyance of the document, when the document passes the reading position 10, the image information of the document is read by the reading unit 12. The document whose image information has been read is discharged to the outside of the ADF 1 by the most-downstream conveyance roller pair 9, and is stacked on the discharging tray 11.

Note that although the description has been made, in the present embodiment, for the case where the reading unit 12 is disposed only in the reader portion 2 of the image reading apparatus 101, the reader unit may be disposed in the ADF 1. The reading unit of the ADF 1 may be a CIS image sensor unit, or may be a CCD image sensor unit. In the case where the reading unit of the ADF 1 is disposed in addition to the reading unit 12 of the present embodiment, the image reading apparatus 101 can read the image information from both sides of a document in a single document-feeding-reading operation.

Document Tray

Next, the first document tray 3 and the second document tray 5 of the ADF 1 will be further described. As illustrated in FIGS. 1, 2A, and 2B, the first document tray (i.e., a main tray) 3 has a first supporting surface 4 on which the document M1 is placed. The second document tray (i.e., a sub-tray or an auxiliary tray) 3 has a second supporting surface 6 on which the document M2 is placed. The first supporting surface 4 is an example of a first supporting surface configured to support a first sheet, and the second supporting surface 6 of the second document tray 5 is an example of a second supporting surface configured to support a second sheet.

The width of the second supporting surface 6 in the sheet width direction Dw is smaller than the width of the first supporting surface 4 in the sheet width direction Dw. Thus, the document M1, such as an A4-size sheet, whose length in the sheet width direction Dw is relatively long can be placed on the first document tray 3, and the document M2, such as a business card or a receipt, whose length in the sheet width direction Dw is relatively short can be placed on the second document tray 5.

Note that the second document tray 5 also includes a third supporting surface 6a (FIG. 6B) in addition to the second supporting surface 6. The third supporting surface 6a supports a document at a position above the second supporting surface 6. The third supporting surface 6a is a surface on which a document whose length in the sheet width direction Dw is smaller than that of the document M2 placed on the second supporting surface 6 can be placed.

Figure 3A:
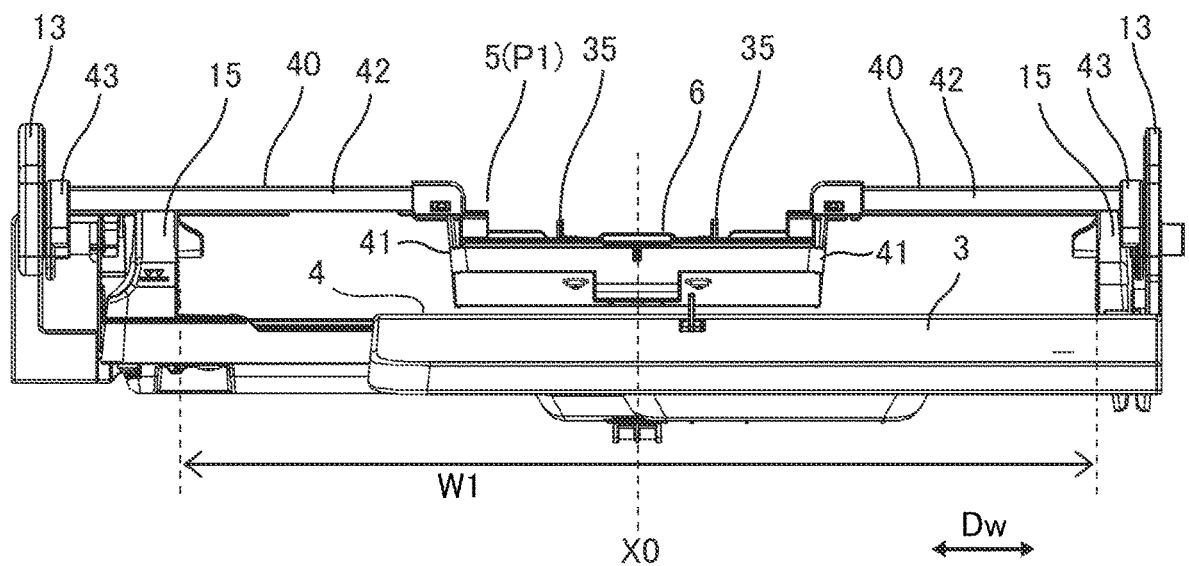
FIG. 3A is a diagram for illustrating a configuration of an ADF of the first embodiment.

As illustrated in FIG. 1, holding members 13 (which are support members or fixing members for supporting the second document tray 5) are fixed to the first document tray 3 for holding the second document tray 5. The holding members 13 are disposed on both sides of the first supporting surface 4 in the sheet width direction Dw (that is, one holding member 13 is disposed on one side and the other holding member 13 is disposed on the other side). The holding members 13 of the present embodiment are disposed outside below-described side-edge guides 15 in the sheet width direction Dw. The side-edge guides 15 allow the ADF 1 to feed a document that has a maximum width of W1 (FIG. 3A). The holding members 13 and the second document tray 5 can be detachably attached to the first document tray 3.

As illustrated in FIG. 3A, the second document tray 5 includes arm portions 40 that extend from the second supporting surface 6 toward both sides in the sheet width direction Dw. Each of the arm portions 40 includes a wall surface portion 41 that extends upward from an edge portion of the second supporting surface 6 formed in the sheet width direction Dw, an extension portion 42 that extends from the upper edge of the wall surface portion 41 outward in the sheet width direction Dw, and a held portion 43 that is connected with the outer-side edge of the extension portion 42 and held by the holding member 13. The held portion 43 is a plate-like member that extends from the extension portion 42 downward and toward the upstream side in the sheet feeding direction Df. That is, when viewed in the sheet feeding direction Df, each of the arm portions 40 has a U-shape that is opened downward.

Thus, the second supporting surface 6 is held by the arm portions 40 having the above-described shape, in a state where the second supporting surface 6 is disposed above and separated from the first supporting surface 4 of the first document tray 3 (that is, the second supporting surface 6 floats above the first supporting surface 4). In this configuration, a document can be placed on the first supporting surface 4 even when the second document tray 5 is positioned at a below-described first position P1.

The second document tray 5 is held by the holding members 13 such that the second document tray 5 can move between the first position (i.e., a use position or a feeding position) P1 illustrated in FIG. 2A, and a second position (i.e., a non-use position or a retracting position) P2 illustrated in FIG. 2B. Both of the first position P1 and the second position P2 are positions above the first document tray 3. That is, whichever of the first position P1 and the second position P2 the second document tray 5 is positioned at, there is a positional relationship between the first document tray 3 and the second document tray 5 in which the second document tray 5 and the first document tray 3 at least partly overlap with each other when viewed from above. The second position P2 is a position at which the second document tray 5 is located above and retracted from the first position P1.

In a state where the second document tray 5 is positioned at the first position P1 (FIG. 2A), the feeding roller 8 can feed the document M2 supported on the second supporting surface 6. In addition, in a state where the second document tray 5 is positioned at the second position P2 (FIG. 2B), the feeding roller 8 can feed the document M1 supported on the first supporting surface 4. Note that when the second document tray 5 is positioned at the second position P2, the document M1 is supported on the first supporting surface 4, at a position between the first document tray 3 and the second document tray 5 in a direction perpendicular to the first supporting surface 4.

In the present embodiment, in a state where the second document tray 5 is positioned at the first position P1 (FIG. 2A), the feeding roller 8 can successively feed both of the document M1 (first sheet) supported on the first supporting surface 4 and the document M2 (second sheet) supported on the second supporting surface 6. That is, a user can respectively place the documents M1 and M2, whose sizes are different from each other, on the first document tray 3 and the second document tray 5 (mixed loading), and can cause the image reading apparatus to perform the document feeding reading on the documents M1 and M2, by giving a single start command for the reading operation. Thus, the image information can be efficiently read from the documents M1 and M2 whose sizes are different from each other. Note that the document reading apparatus may have the specifications in which only the second document tray 5 is used to feed the document M2 therefrom in a state where the second document tray 5 is positioned at the first position P1.

In addition, in a case where the second document tray 5 is not used, a user can retract the second document tray 5 from the first position P1 to the second position P2. With this operation, the document M1 (first sheet) can be placed on the first document tray 3 and the document feeding reading can be performed on the document M1, in a state where the space below the second document tray 5 is increased.

In the present embodiment, the second position P2, to which the second document tray 5 is retracted as described above, is a position above the first document tray 3. In addition, in a state where the second document tray 5 is positioned at the second position P2, the feeding roller 8 can feed the document M1 supported on the first supporting surface 4 of the first document tray 3 at a position below the second document tray 5. In other words, in a state where the second supporting member is positioned at the second position, the feeding member feeds a sheet (i.e., first sheet) supported on the first supporting surface at a position below the second supporting member. Thus, the space occupied by the ADF 1 in the sheet feeding direction Df can be made smaller than the space occupied by the ADF in which the second document tray 5 is retracted upstream of the first document tray 3 in the sheet feeding direction Df when the second document tray 5 is not used.

Thus, the present embodiment can provide a sheet feeding apparatus, an image reading apparatus, and an image forming apparatus that can feed sheets with a variety of sizes, and that can increase the space-saving feature.

Note that in both (i) a state in which the second document tray 5 is positioned at the first position P1 and (ii) a state in which second document tray 5 is positioned at the second position P2, it is preferable that the second document tray 5 is positioned downstream in the sheet feeding direction Df relative to the upstream edge of the first document tray 3 in the sheet feeding direction Df. With this arrangement, the space occupied by the ADF 1 in the sheet feeding direction Df can be further decreased.

Side-Edge Guide

Figure 3B:
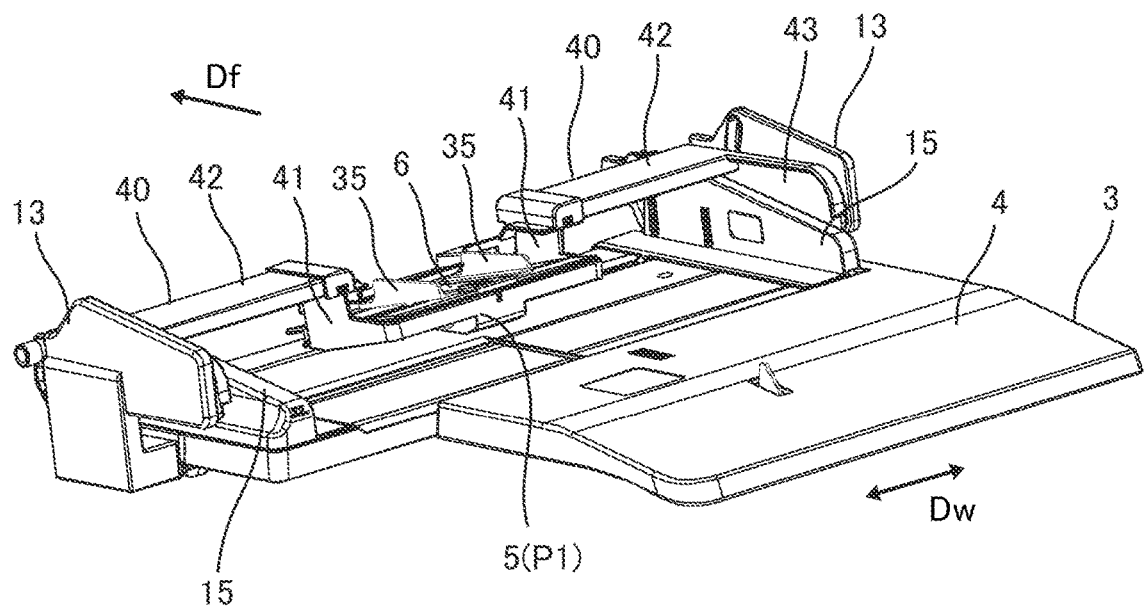
FIG. 3B is a diagram for illustrating the configuration of the ADF of the first embodiment.
Figure 4A:
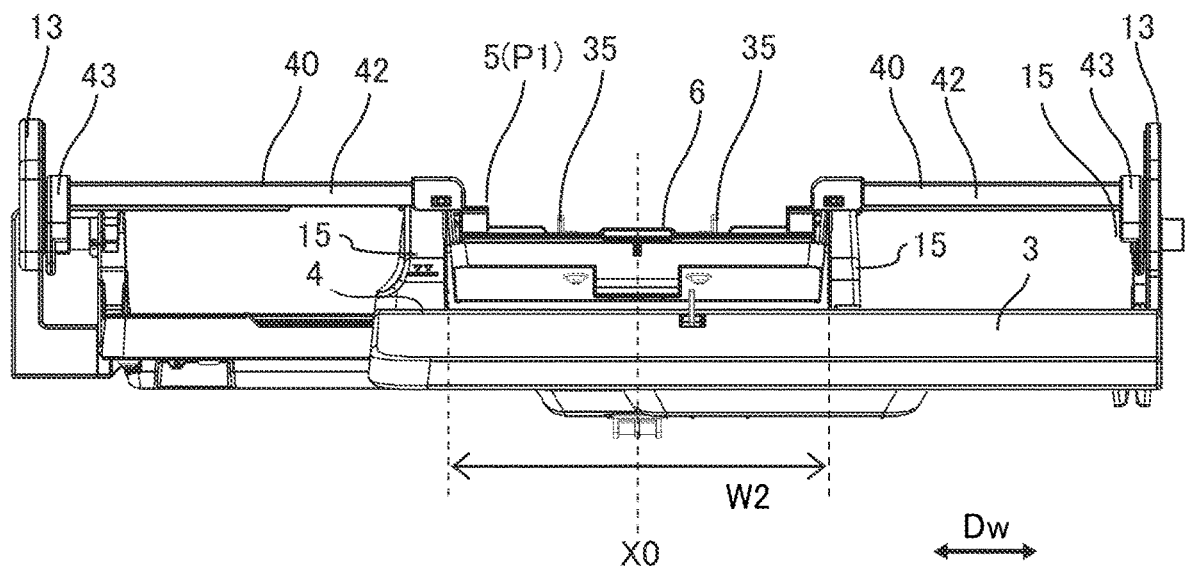
FIG. 4A is a diagram for illustrating the configuration of the ADF of the first embodiment.
Figure 4B:
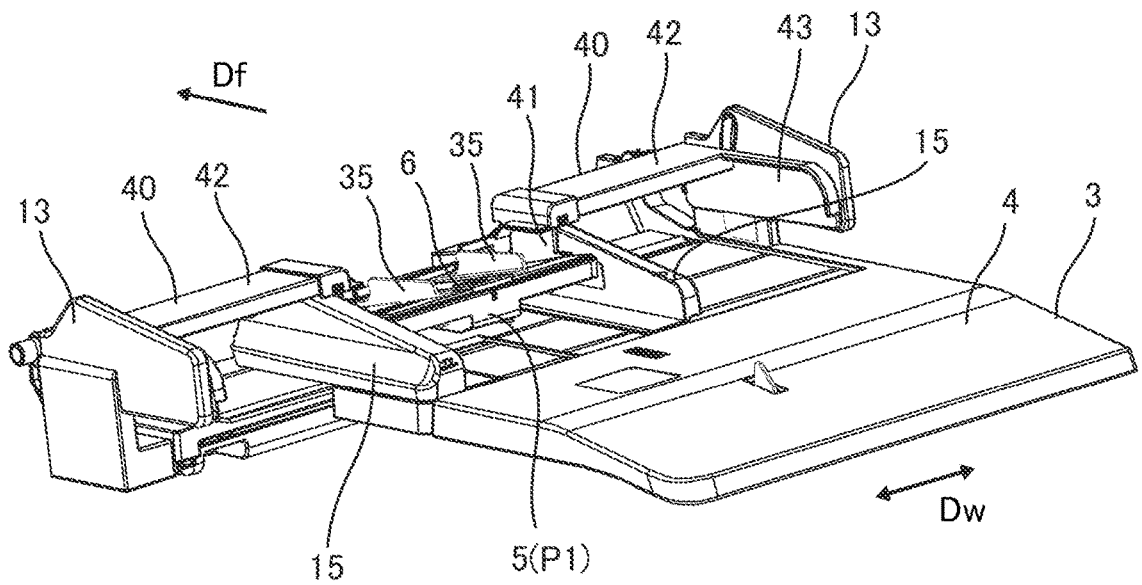
FIG. 4B is a diagram for illustrating the configuration of the ADF of the first embodiment.

Next, the side-edge guides 15 disposed on the first document tray 3 and side-edge guides 35 disposed on the second document tray 5 will be described with reference to FIGS. 3A, 3B, 4A, and 4B. FIGS. 3A and 4A are diagrams of the first document tray 3 and the second document tray 5, viewed from the upstream side in the sheet feeding direction Df. FIGS. 3B and 4B are perspective views of the first document tray 3 and the second document tray 5. FIGS. 3A and 3B illustrate the side-edge guides 15 that have been moved to the outermost positions in a state where the second document tray 5 is positioned at the first position P1. FIGS. 4A and 4B illustrate the side-edge guides 15 that have been moved to the innermost positions in a state where the second document tray 5 is positioned at the first position P1.

As illustrated in FIGS. 3A, 3B, 4A, and 4B, the first document tray 3 is provided with the side-edge guides 15 that regulate the position of the document placed on the first supporting surface 4. Specifically, the side-edge guides 15 regulate the position of the document in the sheet width direction Dw. The side-edge guides 15 are disposed on both sides in the sheet width direction Dw (that is, one side-edge guide 15 is disposed on one side and the other side-edge guide 15 is disposed on the other side). The two side-edge guides 15 are an example of a pair of first regulation members. Since the side edges of the document (i.e., edge portions of the sheet in the sheet width direction Dw) are regulated by the side-edge guides 15, the positional deviation and the skew of the document fed from the first document tray 3 can be suppressed.

The two side-edge guides 15 are linked with each other via an interlocking mechanism, such as a rack-and-pinion mechanism, and move in synchronization with each other in the sheet width direction Dw. Each of the side-edge guides 15 has a regulation surface that faces a side edge of the document. The two side-edge guides 15 move such that the regulation surfaces of the side-edge guides 15 keep the positional relationship in which the regulation surfaces are symmetrical with respect to a central position XO of the first supporting surface 4 in the sheet width direction Dw.

The side-edge guides 15 can move in the sheet width direction Dw, in a range from an upper limit to a lower limit of the width of the document that can be fed by the ADF 1. For example, the upper limit is the width of the A3-size sheet, and the lower limit is the width of the business-card-size sheet. In a case where the second document tray 5 is positioned at the first position P1, the side-edge guides 15 of the present embodiment can move between the regulation position illustrated in FIGS. 3A and 3B and corresponding to the maximum width W1, and the regulation position illustrated in FIGS. 4A and 4B and corresponding to a width W2 smaller than the maximum width W1. Note that even if the second document tray 5 is positioned at the first position P1, the skew of the document whose sheet width is smaller than the width W2 can be suppressed by placing the document on the second document tray 5.

Whichever of the first position P1 and the second position P2 the second document tray 5 is positioned at, the side-edge guides 15 can move in the sheet width direction Dw. More specifically, if the second document tray 5 is positioned at the first position P1 as illustrated in FIGS. 3A and 3B, the side-edge guides 15 can move from the position (FIGS. 3A and 3B) corresponding to the maximum width W1, to the position at which the side-edge guides 15 abut against the wall surface portions 41 (FIG. 4A) of the second document tray 5. When the side-edge guides 15 abut against the wall surface portions 41, the distance between the regulation surfaces of the side-edge guides 15 is equal to the above-described width W2.

In the above-described configuration, in a state where the second document tray 5 is positioned at the first position P1, a document whose size is, for example, in a range from the A3 size to the A5 size can be placed on the first supporting surface 4, and the position of the document can be regulated by the side-edge guides 15.

On the other hand, the second document tray 5 is provided with the side-edge guides 35 that regulate the position of the document placed on the second supporting surface 6. Specifically, the side-edge guides 35 regulate the position of the document in the sheet width direction Dw. The side-edge guides 35 are disposed on both sides in the sheet width direction Dw (that is, one side-edge guide 35 is disposed on one side and the other side-edge guide 35 is disposed on the other side). The two side-edge guides 35 are an example of a pair of second regulation members. Since the side edges of the document (i.e., edge portions of the sheet in the sheet width direction Dw) are regulated by the side-edge guides 35, the positional deviation and the skew of the document fed from the second document tray 5 can be suppressed.

The two side-edge guides 35 are linked with each other via an interlocking mechanism, such as a rack-and-pinion mechanism, and move in synchronization with each other in the sheet width direction Dw. Each of the side-edge guides 35 has a regulation surface that faces a side edge of the document. The two side-edge guides 35 move such that the regulation surfaces of the side-edge guides 35 keep the positional relationship in which the regulation surfaces are symmetrical with respect to a central position XO of the second supporting surface 6 in the sheet width direction Dw (the central position XO of the second supporting surface 6 is equal to the central position XO of the first supporting surface 4 in the present embodiment).

The side-edge guides 35 can move in the sheet width direction Dw, in a range from an upper limit to a lower limit of the width of the document that the ADF 1 can feed from the second document tray 5. In the present embodiment, the lower limit of the width of the sheet that the ADF 1 can feed from the second document tray 5 is equal to the lower limit of the width of the sheet that the ADF 1 can feed. If the second document tray 5 is positioned at the first position P1, the skew of the document whose sheet width is smaller than the above-described width W2 can be suppressed by placing the document on the second document tray 5 and abutting the side-edge guides 35 against the side edges of the document.

Example 1 of Setting of Second Position of Second Document Tray

Figure 5A:
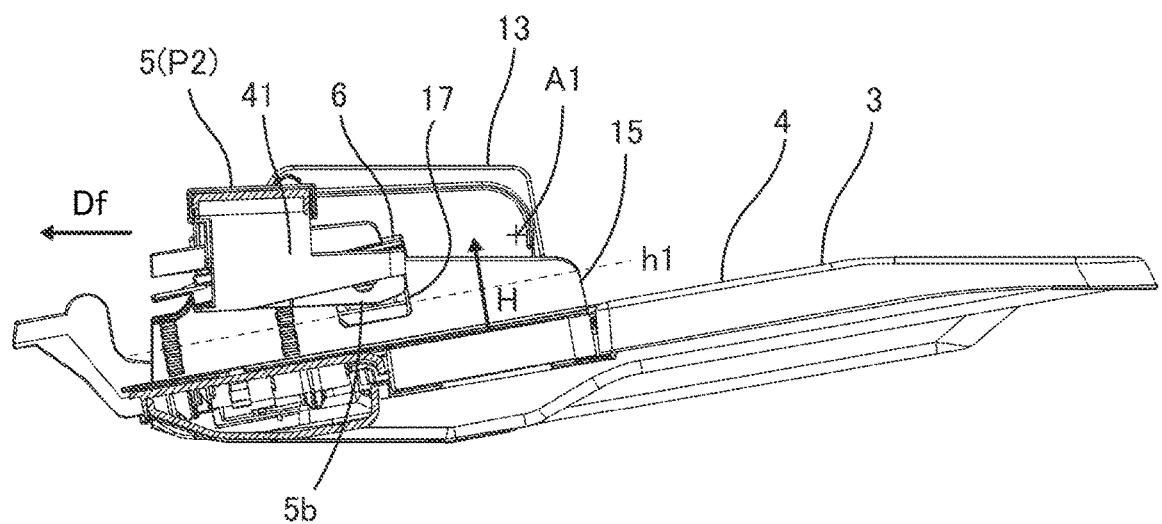
FIG. 5A is a diagram illustrating an example of a second position of a second document tray of the first embodiment.
Figure 5B:
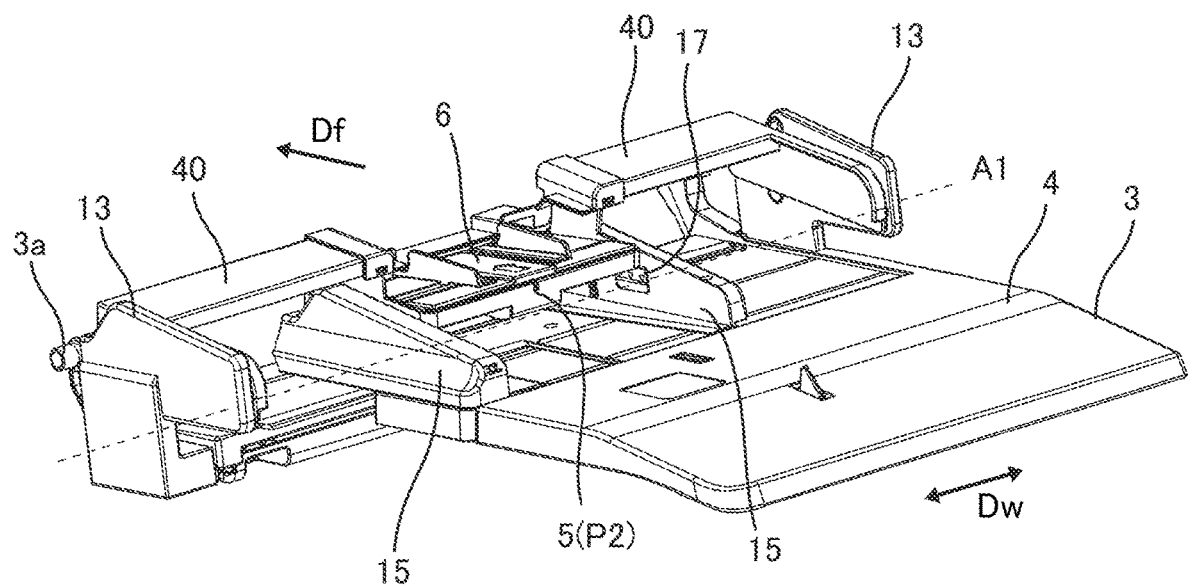
FIG. 5B is a diagram illustrating the example of the second position of the second document tray of the first embodiment.

Next, the second position P2 to which the second document tray 5 is retracted when the second document tray 5 is not used will be described. FIGS. 5A and 5B are diagrams for illustrating an example of setting of the second position P2. FIG. 5A is a side view in which the first document tray 3 and the second document tray 5 are viewed in the sheet width direction Dw in a state where the second document tray 5 is positioned at the second position P2. FIG. 5B is a perspective view of the first document tray 3 and the second document tray 5 in a state where the second document tray 5 is positioned at the second position P2.

In the present embodiment, a mark 17 is given to at least one of the side-edge guides 15. The mark 17 serves as an indicating portion that indicates the amount of documents (i.e., an upper limit position of stack height that is hereinafter referred to as an upper stack limit h1) that can be stacked on the first document tray 3. The mark 17 is disposed at a height at which the uppermost document does not contact the bottom surface of the second document tray 5 even if the stacked documents reach the mark 17.

If the second document tray 5 is positioned at the first position P1, one portion of the second document tray 5 is located below the upper stack limit h1 indicated by the mark 17, in the height direction H defined with respect to the first supporting surface 4. In this case, a user can stack documents on the first document tray 3 until the documents reach a predetermined height lower than the upper stack limit h1, and can place a document whose sheet width is smaller, on the second document tray 5.

On the other hand, as illustrated in FIG. 5A, if the second document tray 5 is moved from the first position P1 to the second position P2, the second document tray 5 is retracted, in the height direction H, to a position above the upper stack limit h1 indicated by the mark 17. Thus, if the second document tray 5 is positioned at the second position P2, a user can stack documents on the first document tray 3 until the documents reach the upper stack limit h1. Note that when the ADF 1 is viewed in the sheet width direction Dw, the height direction His a direction perpendicular to a portion of the first supporting surface 4 that is nearer to the mark 17 than any other portion of the first supporting surface 4.

Thus, in a case where the second position P2 of the second document tray 5 is set above the upper stack limit h1 of the first document tray 3, documents can be stacked on the first document tray 3 until the documents reach the upper stack limit h1, by retracting the second document tray 5 from the first position P1 to the second position P2.

Example 2 of Setting of Second Position of Second Document Tray

Figure 6A:
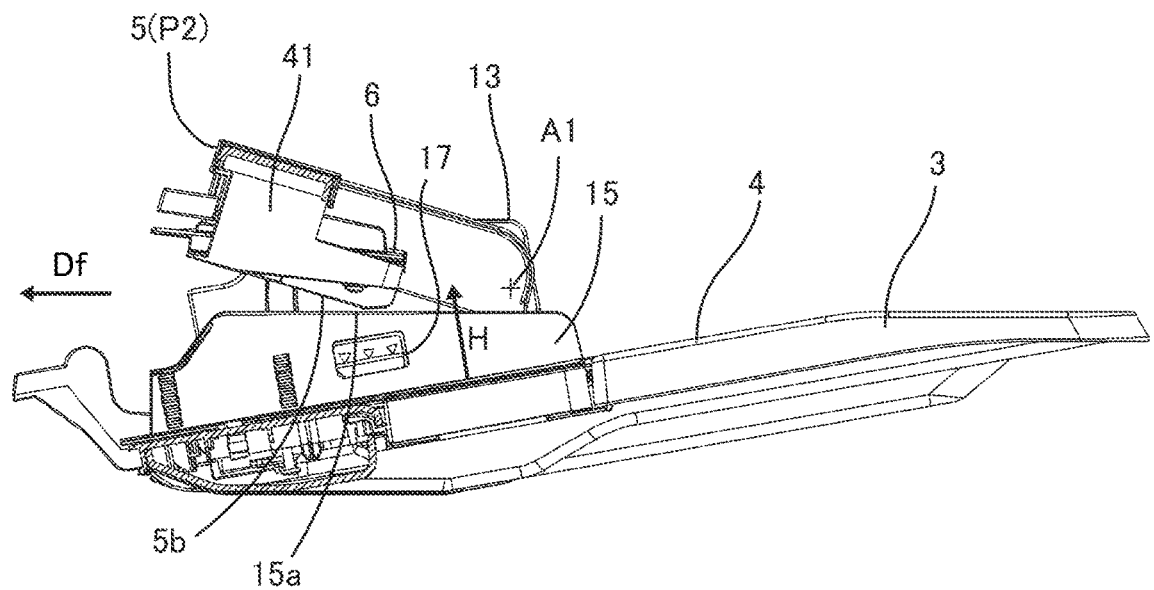
FIG. 6A is a diagram illustrating an example of the second position of the second document tray of the first embodiment.
Figure 6B:
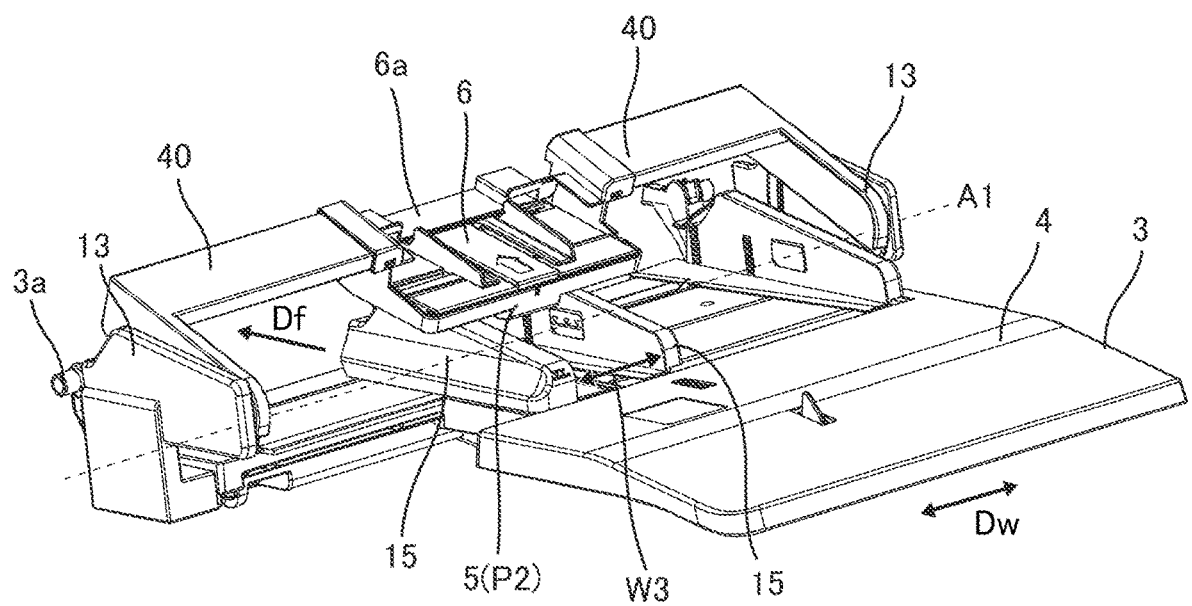
FIG. 6B is a diagram illustrating the example of the second position of the second document tray of the first embodiment.

In another example of setting of the second position P2, as illustrated in FIGS. 6A and 6B, the second position P2 may be a position at which the second document tray 5 does not interfere with the side-edge guides 15. FIG. 6A is a side view in which the first document tray 3 and the second document tray 5 are viewed in the sheet width direction Dw in a state where the second document tray 5 is positioned at the second position P2. FIG. 6B is a perspective view of the first document tray 3 and the second document tray 5 in a state where the second document tray 5 is positioned at the second position P2.

As illustrated in FIG. 6A, if the second document tray 5 is positioned at the second position P2, a bottom surface 5b of the second document tray 5 opposite to the second supporting surface 6 is retracted to a position above an upper edge 15a of each of the side-edge guides 15. Thus, in a state where the second document tray 5 is positioned at the second position P2, each of the side-edge guides 15 can move from a position corresponding to the maximum width W1 (FIG. 3A) of the document that the ADF 1 can feed, to a position corresponding to the minimum width W3 (FIG. 6B), without interfering with the second document tray 5. That is, in the present embodiment, if the second supporting member is positioned at the second position, the pair of first regulation members can move to a position closer to the central position of the first supporting surface in the sheet width direction than a position to which the pair of first regulation members can move when the second supporting member is positioned at the first position.

If necessary, a user may place a document whose width is smaller, on the first supporting surface 4 in a state where the second document tray 5 is retracted to the second position P2, or may place a document whose width is smaller, on the second supporting surface 6 in a state where the second document tray 5 is positioned at the first position P1.

Configuration for Supporting Second Document Tray

Figure 7A:
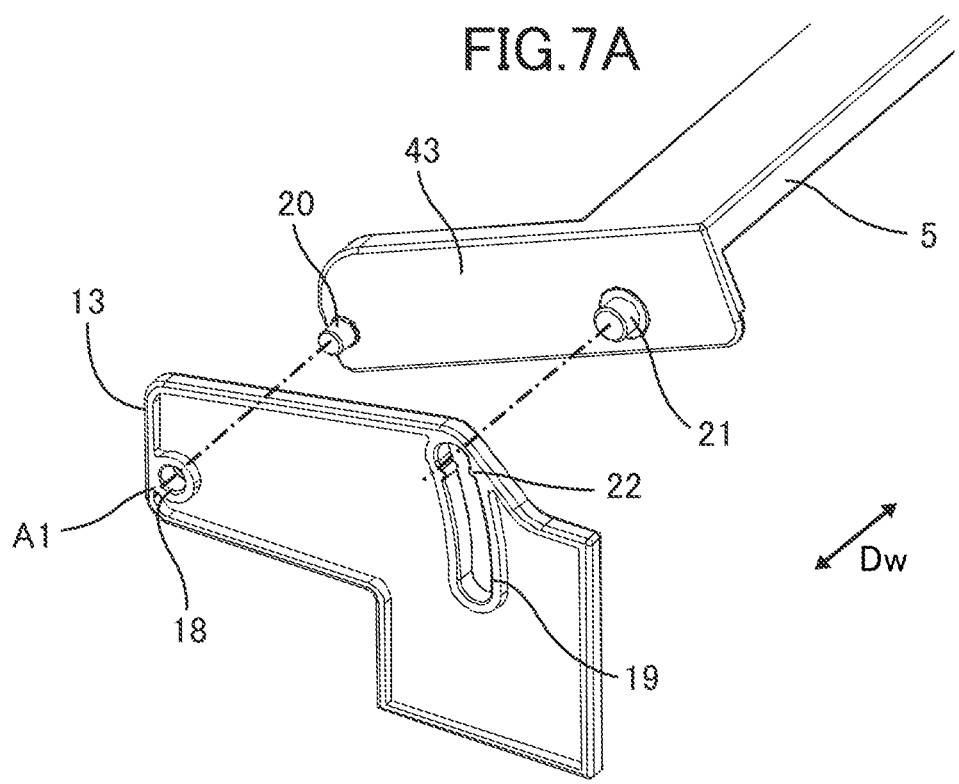
FIG. 7A is a diagram illustrating a configuration for supporting the second document tray of the first embodiment.
Figure 7B:
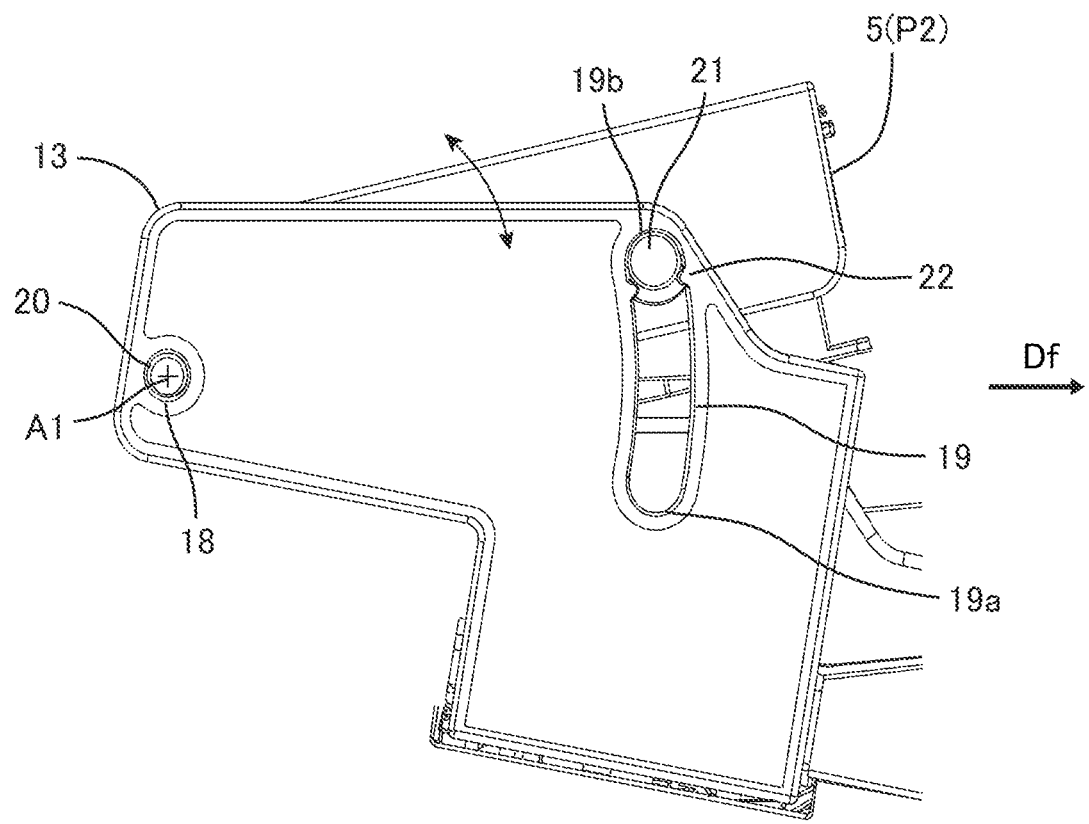
FIG. 7B is a diagram illustrating the configuration for supporting the second document tray of the first embodiment.

Next, a detailed configuration for supporting the second document tray 5 will be described with reference to FIGS. 7A and 7B. FIG. 7A is an exploded view illustrating one holding member 13 (i.e., a holding member 13 on the back side of the apparatus or on the upper right side in FIG. 1) and one portion of the second document tray 5. FIG. 7B is a diagram in which the holding member 13 and the one portion of the second document tray 5 are viewed in the sheet width direction Dw. Note that the following description holds true for the other holding member 13 (i.e., a holding member 13 on the front side of the apparatus or on the lower left side in FIG. 1), except that the positional relationship in the sheet width direction Dw is reversed.

As illustrated in FIG. 7A, the holding member 13 includes a hole portion 18 and a guide portion 19. The hole portion 18 has a substantially cylindrical hole shape that passes through the holding member 13 in the sheet width direction Dw. The guide portion 19 has an arc-like long hole (i.e., an arc-like groove) whose center is the hole portion 18 when viewed in the sheet width direction Dw. The second document tray 5 includes a first projection 20 and a second projection 21, both of which have a shape of a projection and project in the sheet width direction Dw. The first projection 20 and the second projection 21 are formed on the held portion 43 of the second document tray 5. The first projection 20 is a first projection portion that engages with (fits in) the hole portion 18, and the second projection 21 is a second projection portion that engages with (fits in) the guide portion 19.

The second document tray 5 can pivot (swing) on an axis (i.e., a first axis) A1 that extends in a direction along the sheet width direction Dw. The axis A1 of the present embodiment is an imaginary straight line that passes through a substantially central portion of the first projection 20 and a substantially central portion of the hole portion 18.

The axis A1 passes through a space above the first document tray 3, and is positioned upstream of the upstream edge of the second supporting surface 6 in the sheet feeding direction Df (FIGS. 5A and 6A). Thus, when the second document tray 5 is moved around the axis A1 from the first position P1 to the second position P2, the whole of the second supporting surface 6 moves upward.

The range in which the second document tray 5 pivots is restricted by the engagement between the second projection 21 and the guide portion 19. When the second projection 21 is positioned at one end (i.e., a lower end 19a) of the guide portion 19, the second document tray 5 is positioned at the first position P1. When the second projection 21 is positioned at the other end (i.e., an upper end 19b) of the guide portion 19, the second document tray 5 is positioned at the second position P2.

The guide portion 19 includes a narrow portion 22 whose groove width is slightly smaller than the outer diameter of the second projection 21. In a case where the second document tray 5 is moved from the first position P1 to the second position P2, when the second projection 21 forcibly passes through the narrow portion 22, a feeling of a click can be obtained. With this feeling, a user can easily recognize that the posture of the second document tray 5 has been changed correctly. In addition, since the second projection 21 is held by the narrow portion 22, the second document tray 5 is held at the second position P2 even after the user releases his/her hand from the second document tray 5. Note that after the second document tray 5 is moved from the second position P2 to the first position P1, the second document tray 5 is held at the first position P1 due to the self weight of the second document tray 5, in a state where the second projection 21 is in contact with the lower end 19a of the guide portion 19.

Note that the first projection 20 may be disposed on the holding member 13, and the hole portion 18 that engages with the first projection 20 may be formed in the second document tray 5. In addition, the second projection 21 may be disposed on the holding member 13, and the guide portion 19 that engages with the second projection 21 may be formed in the second document tray 5. That is, the first projection portion disposed on any one of the holding member and the second supporting member has only to engage with the hole portion formed in the other of the holding member and the second supporting member, and the second projection portion disposed on any one of the holding member and the second supporting member has only to engage with the groove-shaped guide portion formed in the other of the holding member and the second supporting member. The member on which the first projection portion is disposed and the member on which the second projection portion is disposed may not be equal to each other. That is, one of the first projection portion and the second projection portion may be disposed on the holding member, and the other of the first projection portion and the second projection portion may be disposed on the second supporting member.

Opening and Closing of First Document Tray

Figure 12A:
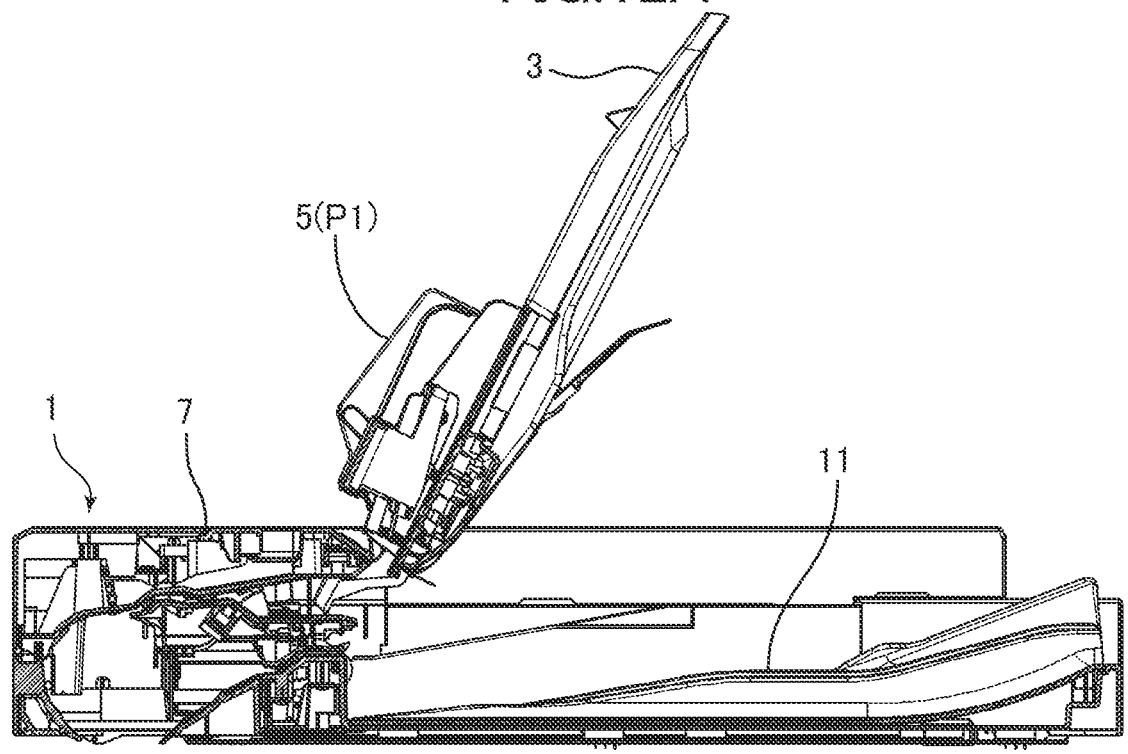
FIG. 12A is a diagram for illustrating the opening and closing of a first document tray of the first embodiment.

By the way, as illustrated in FIG. 12A, the first document tray 3 is supported such that the first document tray 3 can pivot (i.e., can be opened and closed) with respect to the main-body portion 7 of the ADF 1. The first document tray 3 pivots on an axis that extends in the sheet width direction Dw, with a pivot shaft 3a (FIG. 5B) serving as a fulcrum. The pivot shaft 3a is disposed in the downstream end of the first document tray 3 in the sheet feeding direction Df. Thus, a user can easily take out a document stacked on the discharging tray 11, by increasing the space above the discharging tray 11 by pivoting the first document tray 3 upward from a position which is illustrated, for example, in FIG. 1 and at which the first document tray 3 is positioned in the image reading operation. Hereinafter, a position of the first document tray 3 to which the first document tray 3 is pivoted by the maximum angle from the position (i.e., a third position) at which the first document tray 3 is positioned in the image reading operation is defined as an open position (i.e., a fourth position) of the first document tray 3.

Figure 12B:
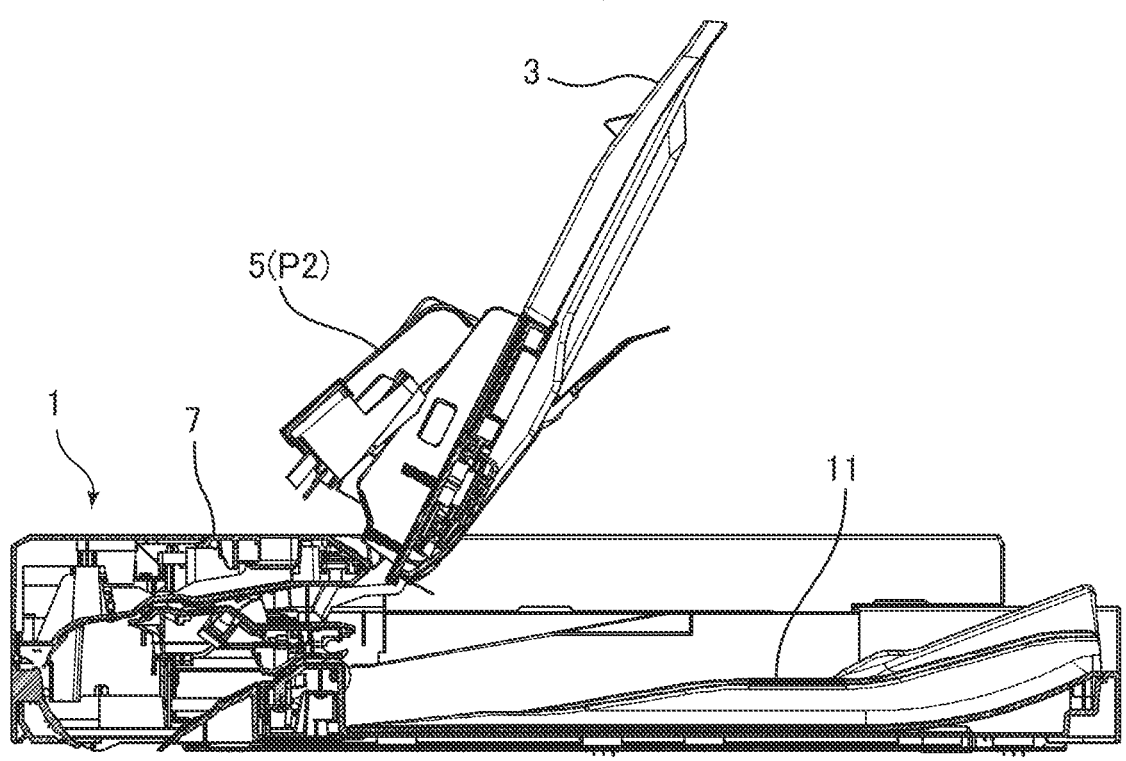
FIG. 12B is a diagram for illustrating the opening and closing of the first document tray of the first embodiment.

In the present embodiment, as illustrated in FIG. 12B, even in a state where the second document tray 5 is positioned at the second position P2, the first document tray 3 can be pivoted to the open position, without the second document tray 5 interfering with the main-body portion 7 of the ADF 1. That is, whichever of the first position P1 and the second position P2 the second document tray 5 is positioned at, the first document tray 3 can be moved between the position, at which the first document tray 3 is positioned in the image reading operation, and the open position. In other words, the second supporting member of the present embodiment is disposed at a position at which the second supporting member does not contact the main-body portion when the first supporting member is pivoted from the third position to the fourth position in a state where the second supporting member is positioned at the second position.

For example, in a comparative example, the second document tray 5 interferes with the main-body portion 7 of the ADF 1 when the first document tray 3 is pivoted to the open position in a state where the second document tray 5 is positioned at the second position P2. In the comparative example, if a user desires to open the first document tray 3, the user will initially move the second document tray 5 to the first position P1. In the present embodiment, however, a user can pivot the first document tray 3 to the open position, without paying attention to which of the first position P1 and the second position P2 the second document tray 5 is positioned at. Thus, the usability can be increased. In addition, in the present embodiment, any damage or the like of a component caused when the second document tray 5 collides with the main-body portion 7 of the ADF 1 can be prevented.

Second Embodiment

Next, a configuration of a second embodiment will be described. The present embodiment differs from the first embodiment in the configuration for supporting the second document tray 5. Thus, the basic configuration of the ADF 1, the image reading apparatus 101, and the image forming apparatus 100 of the present embodiment is the same as that of the first embodiment. Hereinafter, a component given a reference symbol identical to a reference symbol of a component of the first embodiment has substantially the same structure and effect as those of the component of the first embodiment, unless otherwise specified.

Figure 8A:
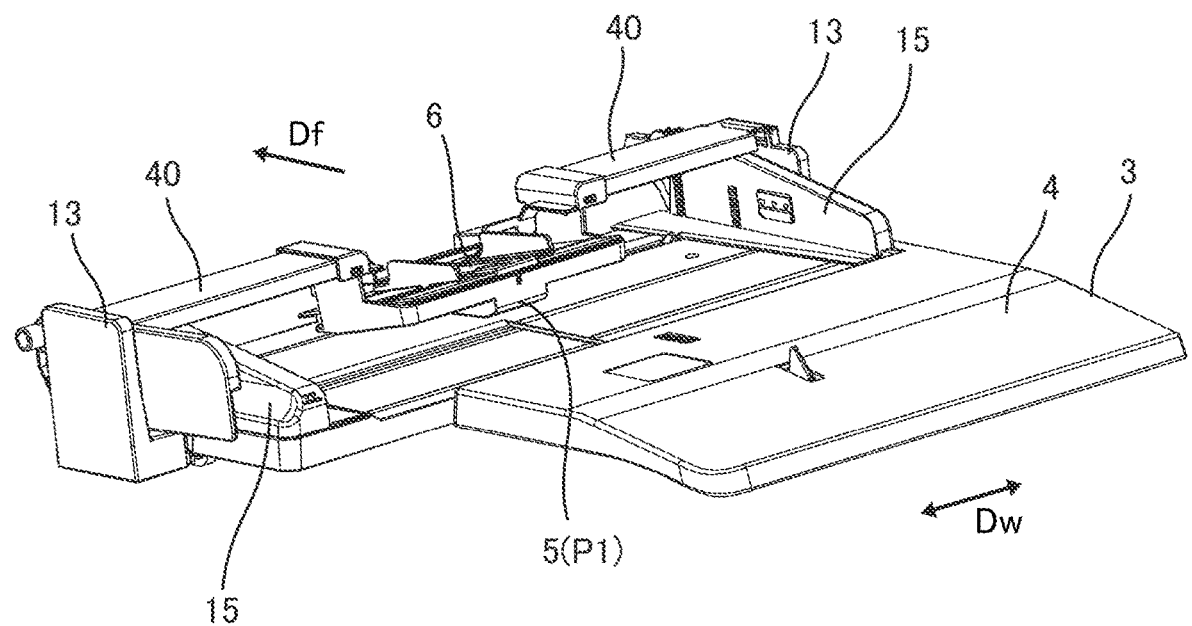
FIG. 8A is a diagram illustrating a configuration for supporting a second document tray of a second embodiment.
Figure 8B:
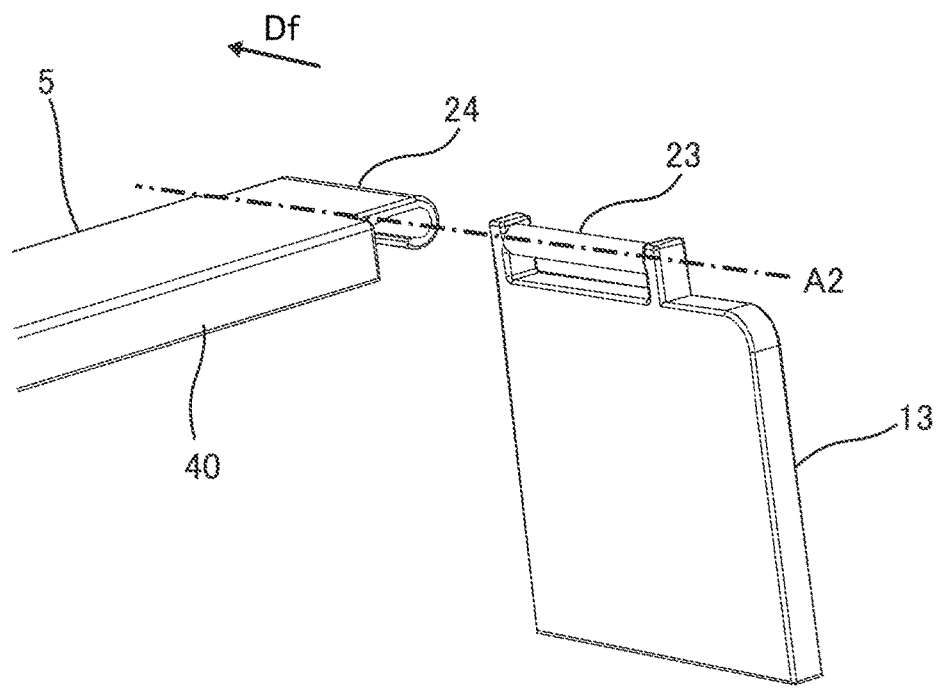
FIG. 8B is a diagram illustrating the configuration for supporting the second document tray of the second embodiment.
Figure 9A:
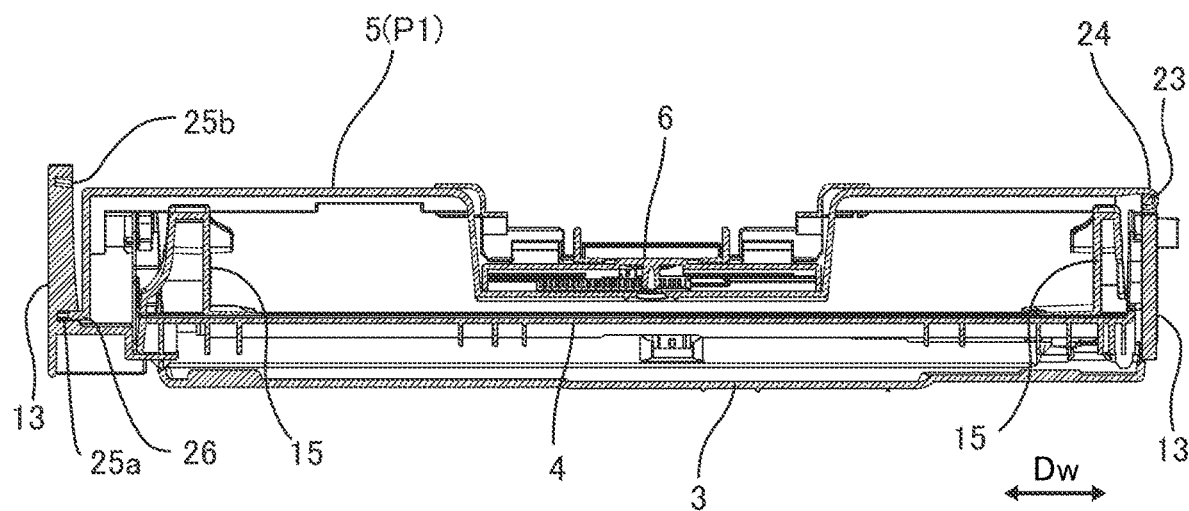
FIG. 9A is a diagram for illustrating a configuration of an ADF of the second embodiment.
Figure 9B:
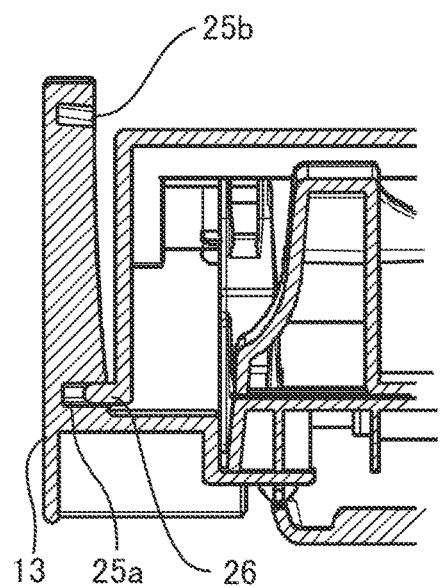
FIG. 9B is a diagram for illustrating the configuration of the ADF of the second embodiment.
Figure 9C:
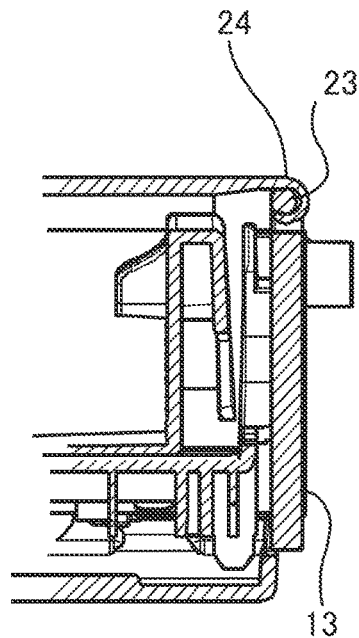
FIG. 9C is a diagram for illustrating the configuration of the ADF of the second embodiment.
Figure 10A:
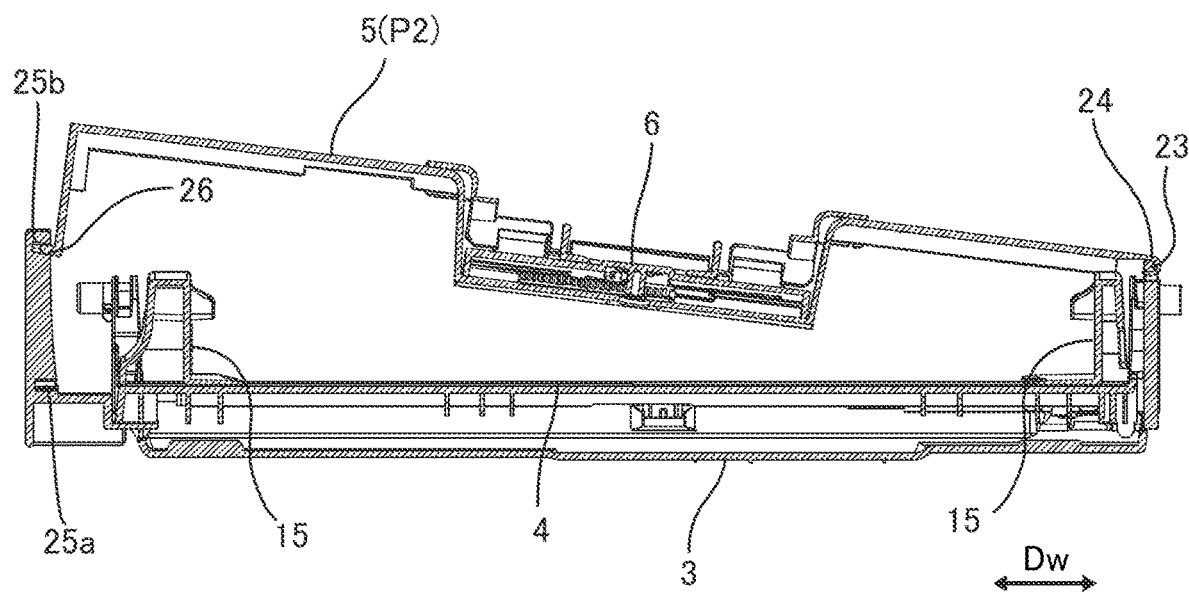
FIG. 10A is a diagram for illustrating the configuration of the ADF of the second embodiment.
Figure 10B:
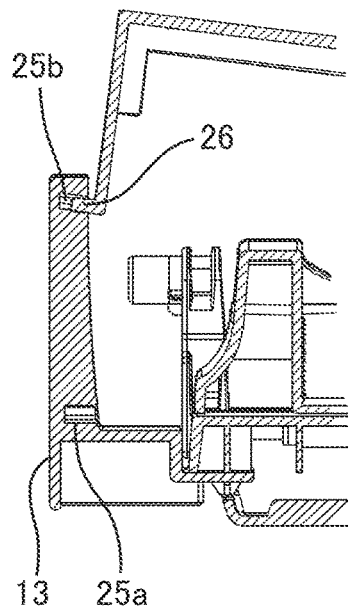
FIG. 10B is a diagram for illustrating the configuration of the ADF of the second embodiment.
Figure 10C:
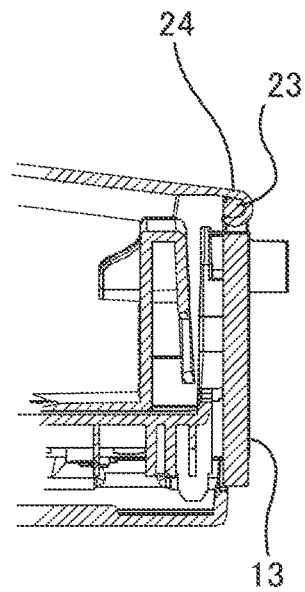
FIG. 10C is a diagram for illustrating the configuration of the ADF of the second embodiment.

FIG. 8A is a perspective view of a first document tray 3 and a second document tray 5 of the second embodiment. FIG. 8B is a perspective view illustrating a holding member 13 and one portion of the second document tray 5 of the second embodiment. FIG. 9A is a cross-sectional view of the first document tray 3 and the second document tray 5, taken along the sheet width direction Dw in a state where the second document tray 5 is positioned at the first position P1. FIG. 9B is an enlarged view illustrating an end portion of the ADF 1, illustrated in FIG. 9A, on one side in the sheet width direction Dw, and FIG. 9C is an enlarged view illustrating an end portion of the ADF 1, illustrated in FIG. 9A, on the other side in the sheet width direction Dw. FIG. 10A is a cross-sectional view of the first document tray 3 and the second document tray 5, taken along the sheet width direction Dw in a state where the second document tray 5 is positioned at the second position P2. FIG. 10B is an enlarged view illustrating an end portion of the ADF 1, illustrated in FIG. 10A, on one side in the sheet width direction Dw, and FIG. 10C is an enlarged view illustrating an end portion of the ADF 1, illustrated in FIG. 10A, on the other side in the sheet width direction Dw.

As illustrated in FIGS. 8A and 8B, one holding member 13 of the second embodiment includes a shaft portion 23 that extends along the sheet feeding direction Df. One end of the second document tray 5 in the sheet width direction Dw is provided with a hook-shaped portion 24, which serves as a fitting portion that fits to the shaft portion 23. Since the hook-shaped portion 24 engages with the shaft portion 23, the second document tray 5 can pivot (swing) on an axis (i.e., a second axis) A2 that extends in a direction along the sheet feeding direction Df.

The axis A2 is positioned at an edge position of the second document tray 5 in the sheet width direction Dw. Thus, when the second document tray 5 is moved around the axis A2 from the first position P1 to the second position P2, the whole of the second supporting surface 6 moves upward.

Note that the shaft portion 23 may be disposed at an end portion of the second document tray 5 and the hook-shaped portion 24, which serves as a fitting portion that engages with the shaft portion 23, may be disposed on the holding member 13.

As illustrated in FIGS. 9A and 10B, a first groove portion 25a and a second groove portion 25b are formed in a holding member 13 (i.e., a holding member 13 on the left side in FIGS. 9A and 10B) opposite to the holding member 13 provided with the shaft portion 23. In addition, a positioning projection 26 that engages with the first groove portion 25a or the second groove portion 25b is formed on an end portion of the second document tray 5 opposite to the hook-shaped portion 24.

As illustrated in FIGS. 9A to 9C, if the positioning projection 26 of the second document tray 5 is forced to engage with the first groove portion 25a, which serves as a first positioning portion, the second document tray 5 is positioned at the first position P1. As illustrated in FIGS. 10A to 10C, if the positioning projection 26 of the second document tray 5 is forced to engage with the second groove portion 25b, which serves as a second positioning portion, the second document tray 5 is positioned at the second position P2. A user can move the second document tray 5 to the first position P1 or the second position P2 by bending the second document tray 5 and separating the positioning projection 26 from the first groove portion 25a or the second groove portion 25b.

Also in the present embodiment, the second position P2, to which the second document tray 5 is retracted as described above, is set above the first document tray 3. In addition, in a state where the second document tray 5 is positioned at the second position P2, the feeding roller 8 can feed the document M1 supported on the first supporting surface 4 of the first document tray 3 at a position below the second document tray 5. In other words, in a state where the second supporting member is positioned at the second position, the feeding member feeds a sheet (i.e., first sheet) supported on the first supporting surface at a position below the second supporting member. Thus, the space occupied by the ADF 1 in the sheet feeding direction Df can be made smaller than the space occupied by the ADF in which the second document tray 5 is retracted upstream of the first document tray 3 in the sheet feeding direction Df when the second document tray 5 is not used.

Thus, the present embodiment can provide a sheet feeding apparatus, an image reading apparatus, and an image forming apparatus that can feed sheets with a variety of sizes, and that can increase the space-saving feature.

Third Embodiment

Next, a configuration of a third embodiment will be described. The present embodiment differs from the first embodiment in the configuration for supporting the second document tray 5. Thus, the basic configuration of the ADF 1, the image reading apparatus 101, and the image forming apparatus 100 of the present embodiment is the same as that of the first embodiment. Hereinafter, a component given a reference symbol identical to a reference symbol of a component of the first embodiment has substantially the same structure and effect as those of the component of the first embodiment, unless otherwise specified.

Figure 11A:
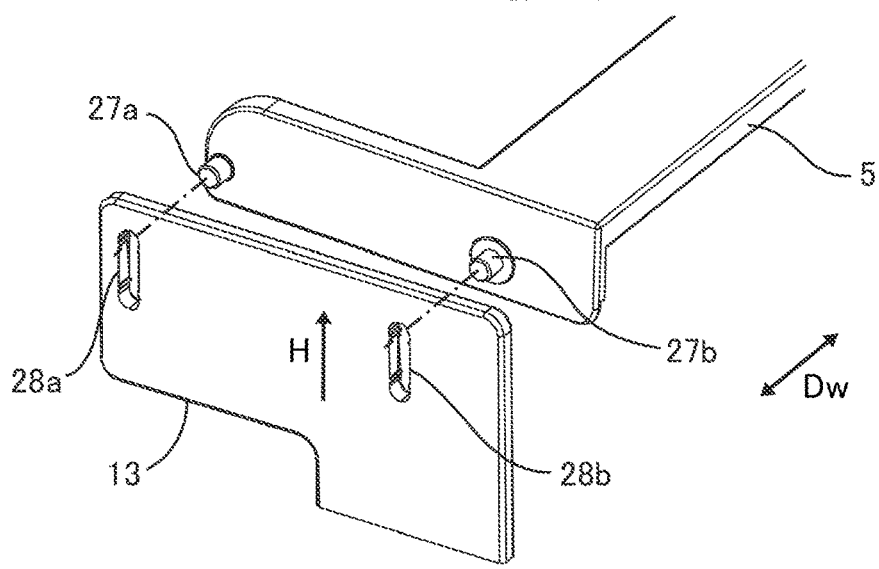
FIG. 11A is a diagram illustrating a configuration for supporting a second document tray of a third embodiment.
Figure 11B:
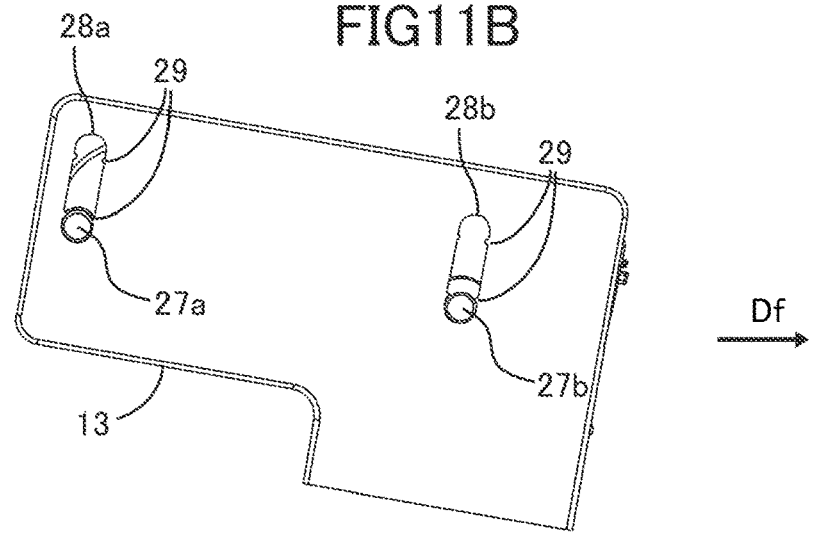
FIG. 11B is a diagram illustrating the configuration for supporting the second document tray of the third embodiment.
Figure 11C:
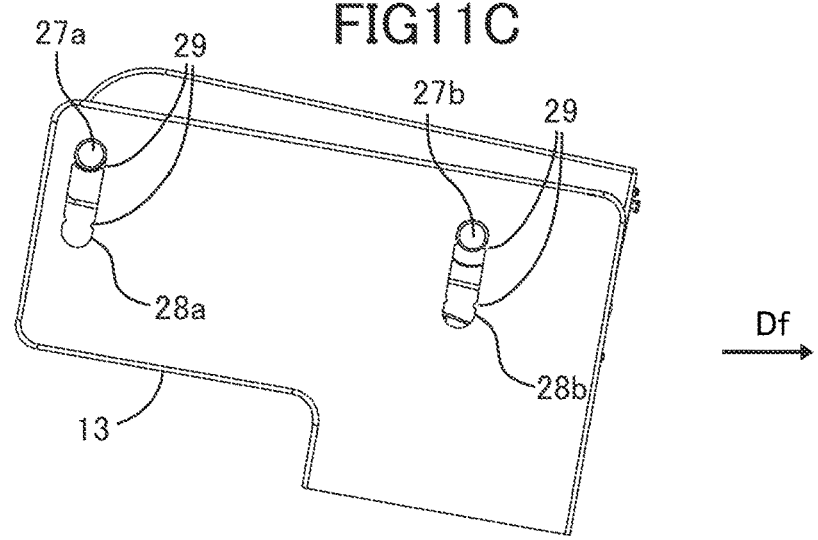
FIG. 11C is a diagram illustrating the configuration for supporting the second document tray of the third embodiment.

FIG. 11A is a perspective view illustrating a holding member 13 and one portion of the second document tray 5 of the third embodiment. FIG. 11B is a diagram in which the holding member 13 and one portion of the second document tray 5 are viewed in the sheet width direction Dw in a state where the second document tray 5 is positioned at the first position P1. FIG. 11C is a diagram in which the holding member 13 and one portion of the second document tray 5 are viewed in the sheet width direction Dw in a state where the second document tray 5 is positioned at the second position P2.

As illustrated in FIG. 11A, the holding member 13 of the third embodiment includes two guide grooves 28a and 28b that extend substantially in the up-down direction. The direction in which the guide grooves 28a and 28b extend is a direction that intersects both of the sheet feeding direction Df and the sheet width direction Dw. Preferably, the direction in which the guide grooves 28a and 28b extend is a height direction H perpendicular to the first supporting surface 4. In addition, the direction in which the guide groove 28a (of the two guide grooves 28a and 28b) extends and the direction in which the guide groove 28b extends are substantially parallel with each other. The single set of the guide grooves 28a and 28b is formed in each of the two holding members 13. The second document tray 5 includes projections 27a and 27b that engage with the guide grooves 28a and 28b, respectively. The single set of the projections 27a and 27b is formed on each of one end and the other end of the second document tray 5 (the one end and the other end of the second document tray 5 are formed in the sheet width direction Dw).

As illustrated in FIGS. 11B and 11C, the projections 27a and 27b move in the guide grooves 28a and 28b, so that the second document tray 5 can slide (i.e., undergo a translatory motion) in the up-down direction, along the direction in which the guide grooves 28a and 28b extend. In this configuration, the second document tray 5 can move between the first position P1 (FIG. 11B) and the second position P2 (FIG. 11C). In the present embodiment, whichever of the first position P1 and the second position P2 the second document tray 5 is positioned at, the posture (angle) of the second document tray 5 remains unchanged.

Each of the guide grooves 28a and 28b includes narrow portions 29 whose groove width is slightly smaller than the outer diameter of the projections 27a and 27b. In a case where the second document tray 5 is moved between the first position P1 and the second position P2, when the projections 27a and 27b forcibly pass through the narrow portions 29, a feeling of a click can be obtained. With this feeling, a user can easily recognize that the posture of the second document tray 5 has been changed correctly. In addition, since the projections 27a and 27b are held by the narrow portions 29, the second document tray 5 is held at the first position P1 or the second position P2 even after the user releases his/her hand from the second document tray 5. Note that a narrow portion 29 for the first position P1 may not be formed. In this case, the second document tray 5 may be held at the second position P2 due to the self weight of the second document tray 5.

Also in the present embodiment, the second position P2, to which the second document tray 5 is retracted as described above, is a position above the first document tray 3. In addition, in a state where the second document tray 5 is positioned at the second position P2, the feeding roller 8 can feed the document M1 supported on the first supporting surface 4 of the first supporting surface 4 at a position below the second document tray 5. In other words, in a state where the second supporting member is positioned at the second position, the feeding member feeds a sheet (i.e., first sheet) supported on the first supporting surface at a position below the second supporting member. Thus, the space occupied by the ADF 1 in the sheet feeding direction Df can be made smaller than the space occupied by the ADF in which the second document tray 5 is retracted upstream of the first document tray 3 in the sheet feeding direction Df when the second document tray 5 is not used.

Thus, the present embodiment can provide a sheet feeding apparatus, an image reading apparatus, and an image forming apparatus that can feed sheets with a variety of sizes, and that can increase the space-saving feature.

Other Embodiments

In the above-described embodiments, the description has been made for the case where the holding members 13, which support the second document tray 5, are attached to the first document tray 3 and the second document tray 5 is supported by the first document tray 3. However, the present disclosure is not limited to this. For example, the holding members 13 may be attached to the main-body portion 7 of the ADF 1. In this case, the second document tray 5 is supported by the main-body portion 7. In another case, the holding members 13 may be formed integrally with the first document tray 3 or the main-body portion 7.

In addition, the second document tray 5 may not include the movable side-edge guides 35. In this case, the side edges of the document may be regulated by guide portions fixed to the second supporting surface 6 (and the third supporting surface 6a).

In addition, in the above-described embodiments, the description has been made for the ADF 1 (as an example of sheet feeding apparatuses) of the image reading apparatus 101 that is disposed on the top portion of the image forming apparatus body. However, the sheet feeding apparatus is not limited to the ADF 1. For example, the sheet feeding apparatus may be a sheet feeding apparatus (i.e., a manual feed unit) that feeds a sheet, which serves as a recording material, from a manual feed tray disposed on a side face portion of the image forming apparatus body so as to be able to be opened and closed. In another case, the sheet feeding apparatus may be an apparatus that feeds a sheet, which serves as a document, and that is disposed in a standalone image reading apparatus that can be used independently of the image forming apparatus body.

1: sheet feeding apparatus (ADF)
3: first supporting member (first document tray)
4: first supporting surface (first supporting surface)
5: second supporting member (second document tray)
6: second supporting surface (second supporting surface)
8: feeding member (feeding roller)
P1: first position
P2: second position The present disclosure can provide a sheet feeding apparatus, an image reading apparatus, and an image forming apparatus that can feed sheets with a variety of sizes, and that can increase the space-saving feature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-001134, filed on Jan. 6, 2023, which is hereby incorporated by reference herein in its entirety.

What is claimed is:

1. A sheet feeding apparatus comprising:
a feeding member configured to feed a sheet in a sheet feeding direction;
a first supporting member including a first supporting surface configured to support a first sheet; and
a second supporting member including a second supporting surface configured to support a second sheet, the second supporting member being configured to move between a first position and a second position, the first position being a position which is above the first supporting member and at which the second supporting member supports the second sheet, the second position being a position to which the second supporting member is retracted upward from the first position,
wherein in a state where the second supporting member is positioned at the first position, the feeding member is configured to feed the first sheet supported on the first supporting surface and the second sheet supported on the second supporting surface, and
wherein in a state where the second supporting member is positioned at the second position, the feeding member is configured to feed the first sheet that is supported on the first supporting surface at a position below the second supporting member.

2. The sheet feeding apparatus according to claim 1, further comprising:
a pair of first regulation members configured to regulate a position of the first sheet supported on the first supporting member in a sheet width direction orthogonal to the sheet feeding direction,
wherein at least one of the pair of the first regulation members includes an indicating portion configured to indicate an upper limit position of height of sheets that are allowed to be stacked on the first supporting surface,
wherein in a state where the second supporting member is positioned at the first position, a portion of the second supporting member is located below the upper limit position in a height direction perpendicular to the first supporting surface, and
wherein in a state where the second supporting member is positioned at the second position, the portion of the second supporting member is located above the upper limit position in the height direction.

3. The sheet feeding apparatus according to claim 1, further comprising:
a pair of first regulation members configured to regulate a position of the first sheet supported on the first supporting member in a sheet width direction orthogonal to the sheet feeding direction,
wherein in a state where the second supporting member is positioned at the first position, a portion of the second supporting member overlaps with the pair of first regulation members when viewed in the sheet width direction, and
wherein in a state where the second supporting member is positioned at the second position, the portion of the second supporting member is positioned above the pair of first regulation members when viewed in the sheet width direction.

4. The sheet feeding apparatus according to claim 3, wherein in a state where the second supporting member is positioned at the second position, the pair of first regulation members is movable to a position closer to a central position of the first supporting surface in the sheet width direction than a position to which the pair of first regulation members movable when the second supporting member is positioned at the first position.

5. The sheet feeding apparatus according to claim 1, wherein the second supporting member is configured to pivot on a first axis extending in a direction along a sheet width direction orthogonal to the sheet feeding direction, between the first position and the second position.

6. The sheet feeding apparatus according to claim 5, wherein the first axis passes through a space above the first supporting member, and is positioned upstream of an upstream edge of the second supporting surface in the sheet feeding direction.

7. The sheet feeding apparatus according to claim 5, further comprising:
a holding member supported by the first supporting member and configured to hold the second supporting member,
wherein the second supporting member is configured to pivot on the first axis by a first projection portion disposed on any one of the holding member and the second supporting member engaging with a hole portion formed in another of the holding member and the second supporting member, and by a second projection portion disposed on any one of the holding member and the second supporting member engaging with a groove-shaped guide portion formed in another of the holding member and the second supporting member.

8. The sheet feeding apparatus according to claim 7, wherein the groove-shaped guide portion includes a narrow portion whose groove width is smaller than an outer diameter of the second projection portion, and
wherein in a case where the second supporting member is moved from the first position to the second position, the second projection portion forcibly passes through the narrow portion, and the second supporting member is held at the second position by the narrow portion.

9. The sheet feeding apparatus according to claim 1, wherein the second supporting member is configured to pivot on a second axis extending in a direction along the sheet feeding direction, between the first position and the second position.

10. The sheet feeding apparatus according to claim 9, wherein the second axis is positioned at an end portion of the second supporting member in a sheet width direction orthogonal to the sheet feeding direction.

11. The sheet feeding apparatus according to claim 9, further comprising:
a holding member supported by the first supporting member and configured to hold the second supporting member,
wherein the second supporting member is configured to pivot on the second axis, by a pivot shaft disposed in any one of the holding member and the second supporting member being fitted in a fitting portion formed in another of the holding member and the second supporting member.

12. The sheet feeding apparatus according to claim 11, wherein the holding member is disposed on both sides of the first supporting member in a sheet width direction orthogonal to the sheet feeding direction,
wherein the holding member on a side in the sheet width direction opposite to a side on which the pivot shaft and the fitting portion are disposed includes a first positioning portion and a second positioning portion, and
wherein the first positioning portion is configured to position the second supporting member at the first position by engaging with the second supporting member, and the second positioning portion is configured to position the second supporting member at the second position by engaging with the second supporting member.

13. The sheet feeding apparatus according to claim 1, wherein the second supporting member is configured to move between the first position and the second position by sliding in a direction that intersects the sheet feeding direction and a sheet width direction orthogonal to the sheet feeding direction.

14. The sheet feeding apparatus according to claim 13, further comprising:
a holding member supported by the first supporting member and configured to hold the second supporting member,
wherein the second supporting member is configured to slide in a direction in which a guide groove formed in any one of the holding member and the second supporting member extends, by the guide groove being fitted with a projection formed on another of the holding member and the second supporting member.

15. The sheet feeding apparatus according to claim 1, further comprising:
a main-body portion including a conveyance path through which a sheet fed by the feeding member is conveyed; and
a stacking portion which is disposed below the first supporting member and on which a sheet discharged from the conveyance path is stacked,
wherein the first supporting member is configured to move between a third position and a fourth position with respect to the main-body portion, the third position being a position at which the first sheet supported on the first supporting surface is allowed to be conveyed by the feeding member, the fourth position being a position to which the first supporting member is pivoted upward from the third position, and
wherein the second supporting member is disposed at a position at which the second supporting member does not contact the main-body portion when the first supporting member is pivoted from the third position to the fourth position in a state where the second supporting member is positioned at the second position.

16. The sheet feeding apparatus according to claim 1, wherein in both (i) a state in which the second supporting member is positioned at the first position and (ii) a state in which the second supporting member is positioned at the second position, the second supporting member is positioned downstream in the sheet feeding direction relative to an upstream edge of the first supporting member in the sheet feeding direction.

17. The sheet feeding apparatus according to claim 1, wherein in a state where the second supporting member is positioned at the first position, the feeding member is configured to successively feed a sheet supported on the first supporting member after feeding a sheet supported on the second supporting member.

18. An image reading apparatus comprising:
the sheet feeding apparatus according to claim 1; and
a reading portion configured to read image information from a sheet fed by the sheet feeding apparatus.

19. An image forming apparatus comprising:
the image reading apparatus according to claim 18; and
an image forming portion configured to form an image on a recording material in accordance with image information that is read by the image reading apparatus.

* * * * *